United States Patent
McLean et al.

(10) Patent No.: US 10,283,796 B2
(45) Date of Patent: May 7, 2019

(54) FUEL CELL SYSTEM

(75) Inventors: Gerard F. McLean, West Vancouver (CA); Laura Gill, North Vancouver (CA); Jean-Louis Iaconis, Burnaby (CA); Jeremy Schrooten, Mission (CA); Mikhail Gurin, Burnaby (CA); Benjamin Tam, Vancouver (CA); Sally Seaman, Vancouver (CA); Joerg Zimmermann, Vancouver (CA)

(73) Assignee: INTELLIGEN ENERGY LIMITED, Loughborough (GB)

(*) Notice: Subject to any disclaimer, the term of this patent is extended or adjusted under 35 U.S.C. 154(b) by 1428 days.

(21) Appl. No.: 13/983,719

(22) PCT Filed: Feb. 10, 2012

(86) PCT No.: PCT/US2012/024677
§ 371 (c)(1),
(2), (4) Date: Sep. 5, 2014

(87) PCT Pub. No.: WO2012/109554
PCT Pub. Date: Aug. 16, 2012

(65) Prior Publication Data
US 2015/0118588 A1    Apr. 30, 2015

Related U.S. Application Data

(60) Provisional application No. 61/442,043, filed on Feb. 11, 2011, provisional application No. 61/442,104, (Continued)

(51) Int. Cl.
*H01M 8/06*       (2016.01)
*H01M 8/065*      (2016.01)
(Continued)

(52) U.S. Cl.
CPC ............ *H01M 8/065* (2013.01); *C01B 3/065* (2013.01); *H01M 8/04201* (2013.01);
(Continued)

(58) Field of Classification Search
CPC .. C01B 3/065; F17C 11/005; H01M 8/04201; H01M 8/04208; H01M 8/04216;
(Continued)

(56) References Cited

U.S. PATENT DOCUMENTS 3,895,102 A   7/1975  Gallagher
3,993,577 A   11/1976 Black et al.
(Continued)

FOREIGN PATENT DOCUMENTS

DE    102006040031   2/2008
EP      1962359 A1   8/2008
(Continued)

OTHER PUBLICATIONS

International Search Report and Written Opinion issued in connection with corresponding International Application No. PCT/US2012/024677 dated Jul. 2, 2012.

*Primary Examiner* — Lingwen R Zeng
(74) *Attorney, Agent, or Firm* — BakerHostetler

(57) ABSTRACT

A complete fuel cell system (10) is disclosed. The fuel cell system (10) comprises at least two fuel precursors (16, 18) that react to create hydrogen. A solid fuel precursor (18) can be carried in disposable fuel cartridges (100). A passive pressure control system including a dose pump (22) and a pressure equalization system (24, 300, 504) is provided to dose a liquid fuel precursor (16) to the solid fuel precursor (18) in the fuel cartridge (100). The solid fuel precursor (18) may include larger metallic particles coated by another fine metallic particles such that multiple micro galvanic cells are formed on the surface of the larger metallic particles. The
(Continued)

fuel cell system (10) may also include a gas buffer (40) that stores produced hydrogen that is unneeded by the fuel cell, a water trapping mechanism (604) and an electronic vent (46) that consumes unneeded hydrogen.

9 Claims, 28 Drawing Sheets

Related U.S. Application Data filed on Feb. 11, 2011, provisional application No. 61/442,130, filed on Feb. 11, 2011, provisional application No. 61/441,996, filed on Feb. 11, 2011, provisional application No. 61/442,098, filed on Feb. 11, 2011.

(51) Int. Cl.
| | | |
|---|---|---|
| *H01M 8/0656* | (2016.01) | |
| *H01M 8/04082* | (2016.01) | |
| *H01M 8/04746* | (2016.01) | |
| *C01B 3/06* | (2006.01) | |
| *F17C 11/00* | (2006.01) | |

(52) U.S. Cl.
CPC ... *H01M 8/04208* (2013.01); *H01M 8/04216* (2013.01); *H01M 8/04776* (2013.01); *H01M 8/0656* (2013.01); *F17C 11/005* (2013.01); *Y02E 60/321* (2013.01); *Y02E 60/362* (2013.01)

(58) Field of Classification Search
CPC ............. H01M 8/04776; H01M 8/065; H01M 8/0656; Y02E 60/321; Y02E 60/362
See application file for complete search history.

(56) References Cited

U.S. PATENT DOCUMENTS

| | | |
|---|---|---|
| 4,264,362 A | 4/1981 | Sergev et al. |
| 7,678,479 B2 | 3/2010 | McLean et al. |
| 7,745,034 B2 | 6/2010 | An et al. |
| 2002/0114984 A1 | 8/2002 | Edlund et al. |
| 2003/0010129 A1 | 1/2003 | Gu et al. |
| 2005/0118468 A1 | 6/2005 | Adams et al. |
| 2006/0090397 A1 | 5/2006 | Edlund et al. |
| 2008/0152971 A1 | 6/2008 | Jang et al. |
| 2008/0187798 A1* | 8/2008 | McLean ............... F17C 1/00 429/421 |
| 2009/0075140 A1 | 3/2009 | Hashimoto et al. |
| 2009/0117423 A1 | 5/2009 | Eickhoff |
| 2010/0055517 A1 | 3/2010 | Uzhinsky et al. |
| 2010/0104481 A1 | 4/2010 | Curello et al. |
| 2012/0148486 A1 | 6/2012 | Wang et al. |

FOREIGN PATENT DOCUMENTS

| | | |
|---|---|---|
| GB | 579246 A | 7/1946 |
| WO | WO 2008/022809 A1 | 2/2008 |
| WO | WO 2011/017801 A1 | 2/2011 |

* cited by examiner

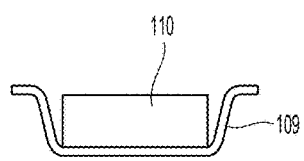
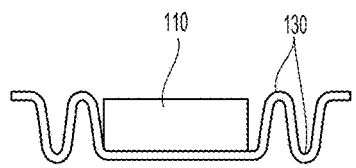
Figure 9A                Figure 9B
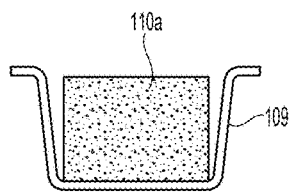
Figure 9C
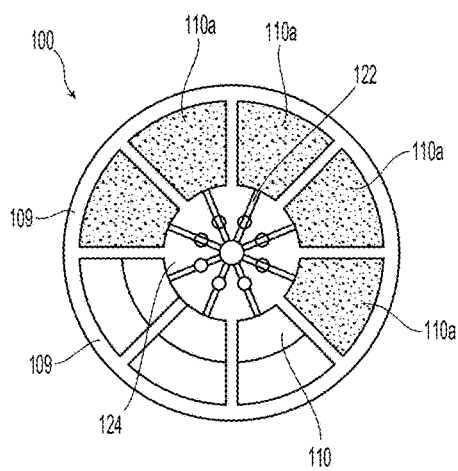
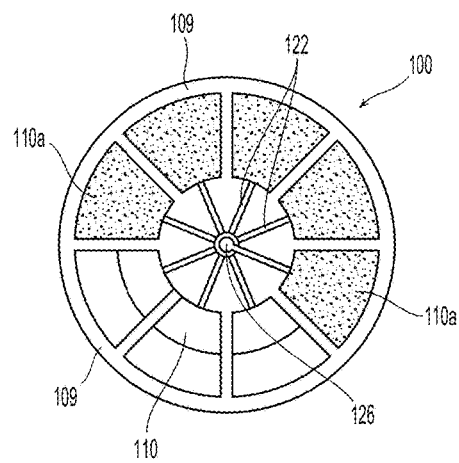
Figure 10A              Figure 10B

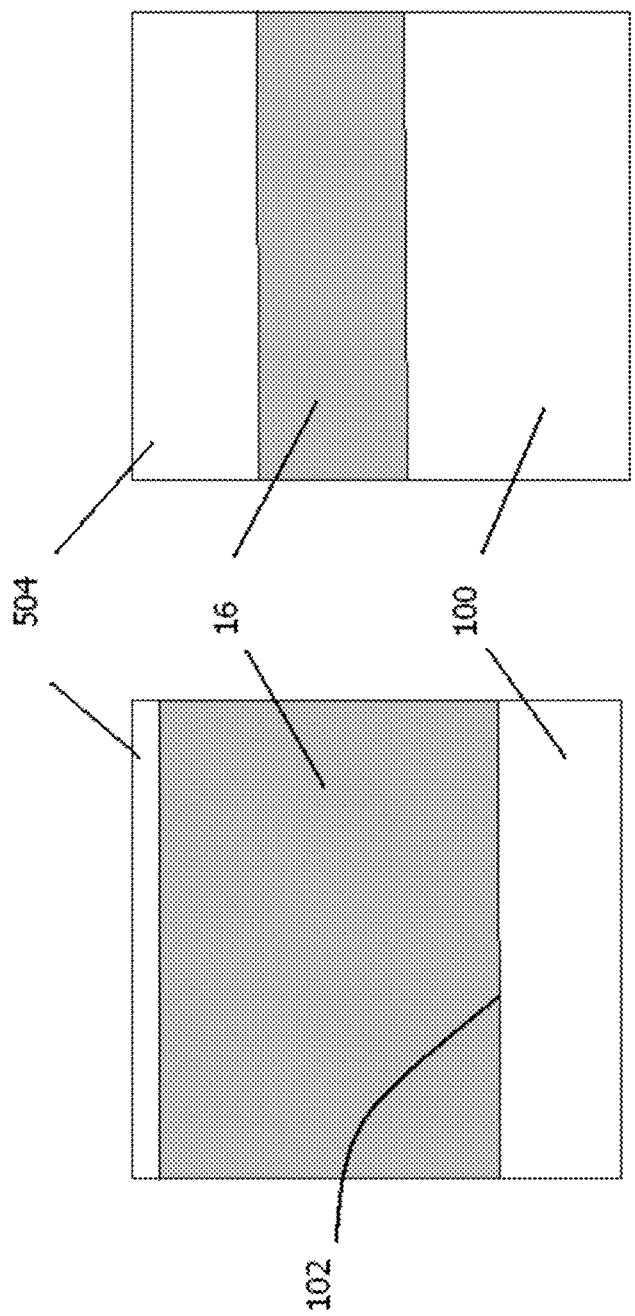

FUEL CELL SYSTEM

The present application claims priority to U.S. provisional patent application entitled "Fuel Cartridge" bearing Ser. No. 61/442,043 and filed on 11 Feb. 2011, U.S. provisional patent application entitled "Fuel Pellet for Use in Hydrogen Generation Systems" bearing Ser. No. 61/442,104 and filed on 11 Feb. 2011, U.S. provisional patent application entitled "Liquid Dosing Fuel Generator" bearing Ser. No. 61/442,130 and filed on 11 Feb. 2011, U.S. provisional patent application entitled "Method and Apparatus for Reducing Hydrogen Venting" bearing Ser. No. 61/442,098 and filed on 11 Feb. 2011, and U.S. provisional patent application entitled "Method and Apparatus for Generating Electrical Power from a Chemical Energy Source" bearing Ser. No. 61/441,996 and filed on 11 Feb. 2011. All five parent provisional patent applications are incorporated herein by reference in their entireties.

FIELD OF THE INVENTION

This invention generally relates to a fuel cell system and in particular a system comprising a fuel cell and a hydrogen generating device. The hydrogen is regulated and transported to the fuel cell where it is converted to electrical energy, which can be used to power any electronic device or to charge a battery.

BACKGROUND OF THE INVENTION

Fuel cells are devices that directly convert chemical energy of reactants, i.e., fuel and oxidant, into direct current (DC) electricity. For an increasing number of applications, fuel cells are more efficient than conventional power generation, such as combustion of fossil fuels, as well as portable power storage, such as lithium-ion batteries. In particular, one use of fuel cells is to replenish the electrical charge of consumer electronic devices such as cell phones, personal digital assistants, personal gaming devices, global positioning devices, rechargeable batteries, etc.

Known fuel cells include alkali fuel cells, polymer electrolyte fuel cells, phosphoric acid fuel cells, molten carbonate fuel cells, solid oxide fuel cells and enzyme fuel cells. Fuel cells generally run on hydrogen ($H_2$) fuel, and they can also consume non pure hydrogen fuel. Non pure hydrogen fuel cells include direct oxidation fuel cells, such as direct methanol fuel cells (DMFC), which use methanol, or solid oxide fuel cells (SOFC), which use hydrocarbon at high temperature. Hydrogen fuel can be stored in compressed form or within compounds such as alcohols or hydrocarbons or other hydrogen containing materials that can be reformed or converted into hydrogen fuel and byproducts. Hydrogen can also be stored in chemical hydrides, such as sodium borohydride ($NaBH_4$), that react with water or an alcohol to produce hydrogen and byproducts. Hydrogen can also be adsorbed or absorbed in metal hydrides, such as lanthanum pentanickel ($LaNi_5$) at a first pressure and temperature and released to a fuel cell at a second pressure and temperature. Hydrogen can also be released via thermolysis reaction between a metal hydride such as magnesium hydride ($MgH_2$) and water.

Most low temperature hydrogen fuel cells have a proton exchange membrane or polymer electrolyte membrane (PEM), which allows the hydrogen's protons to pass through but forces the electrons to pass through an external circuit, which advantageously can be a cell phone, a personal digital assistant (PDA), a computer, a power tool or any device that uses electron flow or electrical current. The fuel cell reaction can be represented as follows:

Half-reaction at the anode of the fuel cell:

$$H_2 \rightarrow 2H^+ + 2e^-$$

Half-reaction at the cathode of the fuel cell:

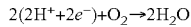
$$2(2H^+ + 2e^-) + O_2 \rightarrow 2H_2O$$

Generally, the PEM is made from a proton exchange polymer which acts as the electrolyte, such as Nafion® available from DuPont, which is a perfluorinated sulfonic acid polymer or other suitable membranes. The anode is typically made from a Teflonized carbon paper support with a thin layer of catalyst, such as platinum-ruthenium, deposited thereon. The cathode is typically a gas diffusion electrode in which platinum particles are bonded to one side of the membrane.

The patent and scientific literatures disclose few complete and commercialize-able fuel cell systems that include the generation of hydrogen fuel, the control of the fluidics, the balance of plant and the electrical power generation. Hence, there remains a need for such fuel cell systems.

SUMMARY OF THE INVENTION

The present invention is directed to a fuel cell system comprising a hydrogen generation system, and an electrical generation system including a fuel cell. The fuel cell system may also have a gas buffer that stores hydrogen generated by the hydrogen generation system when the hydrogen generated exceeds an amount consumable by the fuel cell to generate electricity. The gas buffer can be an inflatable, flexible or resilient member, or a metal hydride that absorbs and desorbs hydrogen or a fixed volume buffer that stores pressurized hydrogen. The gas buffer may be located upstream or downstream of the fuel cell.

The hydrogen generation system comprises a solid fuel that reacts with an aqueous liquid to generate hydrogen. The solid fuel can be any fuel that reacts with the aqueous liquid to produce hydrogen, including chemical hydrides or metals that react galvanically with an electrolyte to produce hydrogen. In one embodiment, first metallic particles are coated by smaller second metallic particles, such that multiple galvanic cells are formed on a surface of the first metallic particles between the metals in the first metallic particles and the second metallic particles. In one example, the solid fuel comprises magnesium particles coated by smaller iron particles. Silicon particles may also coat the magnesium particles. Salts may be included into the solid fuel or be dissolved in the aqueous liquid. Fire retardants such potassium chloride may also be added to the solid fuel. In another embodiment, the solid fuel may be suspended in a suspension agent, such as mineral oil or dispersant, to form slurries or gels. Preferably, the suspension agent is non-hygroscopic.

The solid fuel precursor can be carried in disposable fuel cartridges. The fuel cartridges may be segmented and each segment carries at least one single fuel pellet. As the fuel pellet reacts it expands and when it is fully reacted it closes an access to its segment to encourage the liquid fuel precursor to go to the next-in-line segment.

The fuel cartridge, which may be disposable, can be bendable to be inserted into the fuel cell system. As stated above, the fuel cartridge can be segmented into multiple segments. Each segment contains a predetermined amount of the solid fuel sized and dimensioned to minimize a dynamic of the reaction between the solid fuel and the aqueous liquid. The fuel cartridge comprises at least one liquid channel for the aqueous liquid to reach said fuel pellets and at least one gas channel for the hydrogen to exit the fuel cartridge. The fuel cartridge may comprise at least one normally open valve positioned between the liquid channel and each fuel pellet, wherein said valve closes when said fuel pellet is reacted. The fuel pellet expands when reacting with the aqueous liquid and closes valve. The fuel cartridge may comprise at least one normally closed valve positioned between the liquid channel and each fuel pellet, wherein said valve opens to allow the aqueous liquid to react with said fuel pellet. The liquid channel may be planar or located on the same plane and the gas channel may be non-planar or extends on multiple planes.

The fuel cell may also comprise a pressure equalization mechanism that restores or maintains pressure equalization between a first pressure in a reaction chamber containing the solid precursor and a second pressure in the aqueous liquid. The pressure equalization mechanism includes a diaphragm that separates the hydrogen gas in the reaction chamber from the aqueous liquid and that communicates the pressure of the hydrogen gas to the aqueous liquid. This pressure in the aqueous liquid causes a predetermined dose of the aqueous liquid to enter a dose pump. As hydrogen is transported out of the reaction chamber or the fuel cartridge, the pressure within decreases causing said dose in the dose pump to enter the reaction chamber or the fuel cartridge. In the fuel cartridge disclosed above, a surface of the fuel cartridge may act as this diaphragm.

The electrical generation system may comprise an auxiliary load. The auxiliary load can be (i) a resistive load to consume the electricity produced by excess hydrogen, (ii) a storage device to store said electricity, or (iii) a circuit to perform a function using said electricity, or a combination thereof. In one embodiment, the circuit prevents access to an interior space of the fuel cell system when a pressure within the fuel cell system is above atmospheric pressure, and this circuit may be operational when the fuel cell system is in operation and/or when it is shut-off.

An inflatable volume compensator in fluid communication with the first pressure can be provided to compensate for any volume imbalance between the reaction chamber and the liquid reservoir. A water knock-out device can also be provided to remove water or water vapor from the hydrogen gas.

The present invention also includes methods of operating the fuel cell system summarized above and discussed below.

BRIEF DESCRIPTION OF THE DRAWINGS

In the accompanying drawings, which form a part of the specification and are to be read in conjunction therewith and in which like reference numerals are used to indicate like parts in the various views:

FIG. 9A shows a fuel cup containing an unreacted fuel pellet; FIG. 9B shows an alternative fuel cup; and FIG. 9C show the fuel cups in FIGS. 9A and 9B after the fuel pellet is reacted;

FIGS. 10A and 10B show alternative liquid flow paths within the fuel cartridge;

FIGS. 21A-21B are schematic drawings illustrating the volume compensator;

DETAILED DESCRIPTION OF THE INVENTION

The following parts list compiles the reference numbers and corresponding elements shown in the accompanying drawings.

Figure 1:
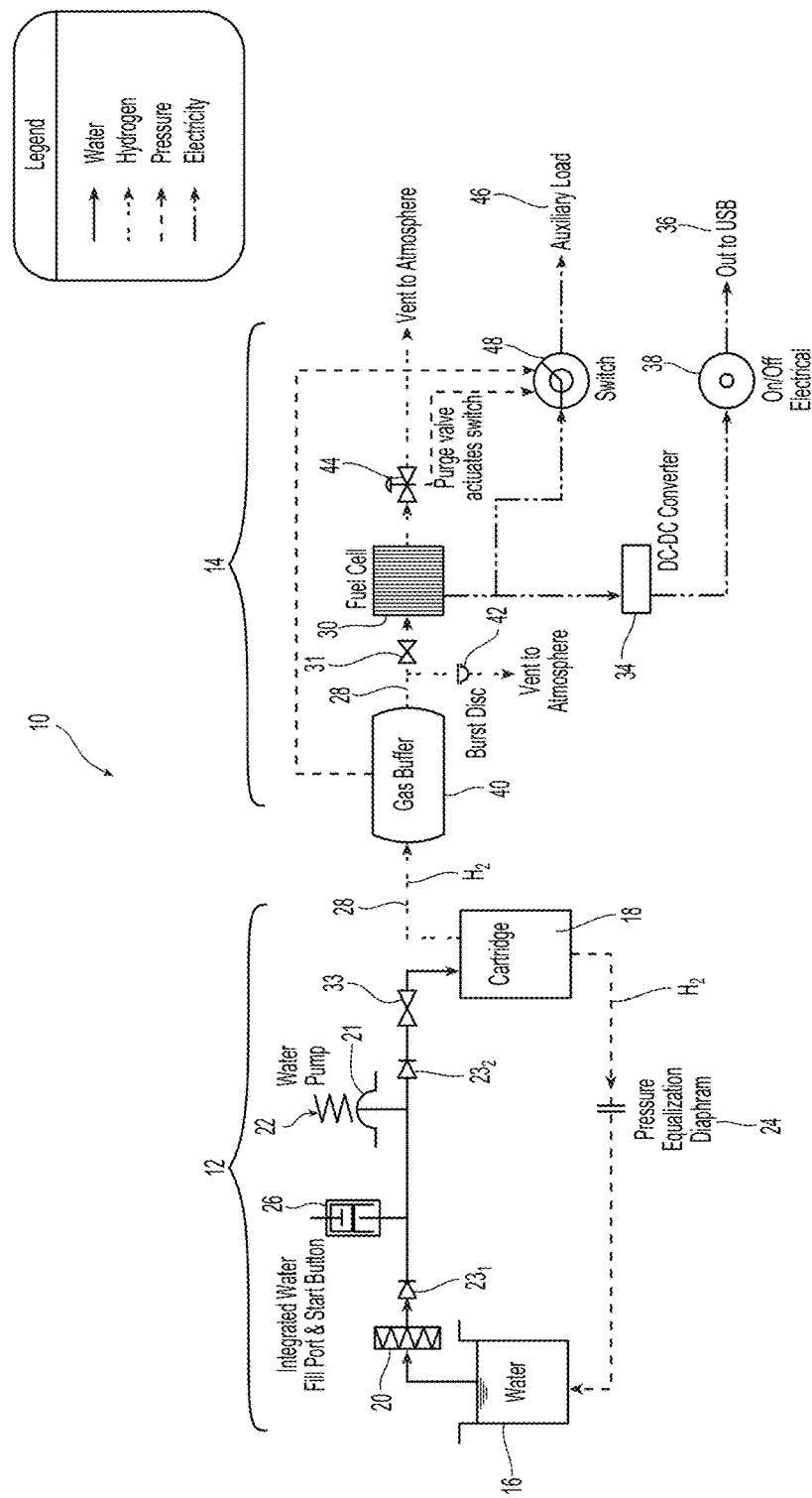
FIG. 1 is a system schematic of an embodiment of the inventive fuel cell system.

10 overall fuel cell system
12 hydrogen generation system
14 electrical generation system
16 liquid precursor
18 solid precursor
20 filter
21 dosing volume
22 dosing pump
$23_1$, $23_2$ check valves
24 pressure equalization diaphragm
26 start mechanism/button
28 produced hydrogen line
30 fuel cell
31 fluidic control element
32 produced electricity line
33 fluidic control element
34 DC-DC converter
36 electrical output port
37 external load 38 ON/OFF switch
40 gas buffer
42 relief valve or burst disc
44 purge valve
46 auxiliary load (resistive or storage)
48 switch
50 housing of overall fuel cell system 10
52 base of housing 50 (cylindrical)
54 lid or cap of housing 50
56, 58 check valves
100 fuel cartridge
102 cup layer
104 filter layer
105 valve layer
106 flow manifold layer
107 liquid flow channel on manifold
108 post
108c cover for post
109 cups on cup layer 102
110 fuel pellets
111 pod for desiccants and scavengers
112 divot on fuel pellet
113 bubbles on filter layer
114 valves
116 hydrogen flow channels on manifold
118 hydrogen holes
119 protruded supports
120 supporting masking layer
121 holes on masking layer 120
122 liquid channel
124 blockage
126 rotating gate
130 folds
204 side wall of base 52 (circular)
208 bottom wall of base 52
212 opening of base 52
216 core member within fuel cell system 10
220 disk member of core 216
222 seal or O-ring
236 water inlet passage from pump to fuel
240 gas flow passage
252 inlet port
256 outlet port
270 buffer chamber within core 216
278 buffer gas passage
282 internal electrical components
300 reaction chamber
302 pressure feedback chamber
304 pressure sensitive membrane
306 gas containing chamber
312 spigot formation
504 volume compensator
506 compensator chamber
604 water trapping volume
612 inlet into water trapping volume
616 outlet from water trapping volume FIG. 1 is a system schematic of an embodiment of the present inventive fuel cell system. Fuel cell system 10 comprises a hydrogen generation system 12 and an electrical generation system 14. Hydrogen generation system 12 comprises a liquid precursor 16 such as water, salt water or an alcohol and a solid precursor 18 generally stored in a cartridge or disposable cartridge, discussed below. Solid precursors include, but are not limited to, magnesium, sodium, calcium, or aluminum with or without iron, copper, nickel, silicon, zinc, tin, boron, chromium, phosphorus, manganese, titanium and zirconium. Further solid precursors may include any chemical hydride that may release hydrogen through a hydrolysis reaction, such as sodium borohydride, or calcium hydride, for example. Various salts, including sodium chloride, potassium chloride and magnesium chloride can also be added to solid precursor 18. Examples of solid precursors that may be utilized with embodiments of the present invention to generate hydrogen on contact with a suitable liquid precursor are discussed further below and are also discussed in parent U.S. provisional application Ser. No. 61/442,104 and in published international patent application WO 2011/017801, which is incorporated herein by reference in its entirety. Any suitable solid precursor which, when reacted with a liquid precursor effects the release of hydrogen may be used with embodiments of this invention. Solid precursor 18 reacts with liquid precursor 16 to produce hydrogen.

Referring again to FIG. 1, liquid precursor 16 is transported or pumped through an optional filter 20 by dosing pump 22. Suitable dosing pumps are discussed in details below and also discussed in parent U.S. provisional application Ser. No. 61/442,130. As illustrated, dosing pump 22 has dose storage 21 and upstream check valve 23$_1$ and downstream check valve 23$_2$. Dosing pump 22 transports liquid precursor 16 to solid precursor 18. In the embodiment of FIG. 1, the produced hydrogen also pressurizes a container of solid precursor 18, which in turn pressurizes the reservoir that holds liquid precursor 16. In some embodiments of dosing pumps 22, an optional pressure equalization device, such as membrane 24, is provided to substantially equalize the hydrogen pressure and the pressure of liquid precursor 16. A starting device, such as starter 26, can be provided to prime hydrogen producing system 12, by initially pushing or pulling an amount of liquid precursor 16 to react with solid precursor 18 to initiate the reaction to produce the first hydrogen. Starter 26, which can be a small bellow, a hand pump, a pushbutton or the like, can be use to start a new system or to restart a previously used system after a significant down time.

Produced hydrogen, shown at line 28, enters the anode side of fuel cell 30 where it reacts with an oxidation source, e.g., oxygen contained in air, at the cathode side of the fuel cell to produce electricity, which is shown schematically at 32. The produced electricity is modulated by a DC-DC converter 34 to DC voltage and current that are acceptable to electricity consumers, such as electronic devices. Modulated DC electricity is made available at an output port 36, such as a USB or an USB2 port, to an external load 37 such as consumer electronic devices. An ON/OFF switch 38 may be provided to actuate electrical output from the fuel cell system to an electronic device. As shown in FIG. 1, a fluidic control element 31 is positioned between fuel cell 30 and hydrogen generation system 12, and preferably in hydrogen line 28 and more preferably downstream of relief valve/burst disc 42. Fluidic control element 31 can be a shut-off valve, a pressure regulator, a flow restrictor or limiter or an ON/OFF switch. Fluidic control element 31 may be used to fluidically isolate fuel cell 30 from hydrogen producing system 12 when it is closed or turned "OFF", and to actuate fuel cell 30 by enabling flow of hydrogen gas through line 28 from hydrogen producing system 12 when it is opened or turned "ON". Another fluidic control element 33 may be provided at any location between liquid precursor 16 and solid precursor 18.

Also present in the electrical generation system 14 is a gas buffer 40, which stores excess or unneeded hydrogen gas for example when fuel cell system 10 shuts down, i.e., when switch 38 is turned OFF, or when the production of hydrogen exceeds the need for electricity generated by fuel cell 30. Gas buffer 40 as shown in FIG. 1 is located upstream of fuel cell 30, but can be located elsewhere in electrical generation system 14 as discussed below. The hydrogen stored in gas buffer 40 can be used at start-up after a first use to generate electricity. Gas buffer 40 may be fixed volume gas buffer (varying pressure), an inflatable or expandable member (varying volume) or a hydrogen sorbent system, such as metal hydride, e.g., $LaNi_5$.

Fuel cell system 10 may have multiple pressure control components. A first pressure control component is gas buffer 40 to store excess hydrogen as discussed above and in more detail below. A second pressure control component is an electrical venting system which may be used to consume or manage excess hydrogen without venting the gas to atmosphere. The electrical venting system comprises an internal, auxiliary electrical load 46 connected to fuel cell 30 through switch 48. Auxiliary load 46 can be a resistive load to consume the electricity, a storage load such as a battery, a capacitor or an ultra-capacitor, a light or LED which would fade when the excess hydrogen is consumed or a circuit which performs a function such as shut-down sequence, maintenance software, write to a memory device, etc. Another function of such circuit may be to prevent access to the internal components of fuel cell system 10 when there is hydrogen pressure in the system above standard atmospheric pressure or above any predetermined pressure level, and this circuit may be operated by excess hydrogen converted to electricity or by hydrogen and electricity produced by fuel cell system 10 during normal operations.

Excess hydrogen from gas buffer 40 or elsewhere in the system is connected to switch 48 and the expansion or pressure of gas buffer 40 may trigger switch 48 to connect auxiliary load 46 to fuel cell 30 to consume electricity produced from the excess hydrogen. Additionally, when ON/OFF switch 38 is turned to OFF, electricity generated by the remaining hydrogen in the system would be directed to auxiliary load 46. A third pressure control component is relief valve and/or burst disk 42 provided along line 28 or anywhere in the hydrogen fluidics to vent gas when a predetermined pressure level is met. When a pressure regulator or limiter is used as a fluidic control element 31, the pressure regulator can be another pressure control component, controlling the hydrogen pressure to fuel cell 30.

A purge valve 44 is provided to allow gas, such as unused fuel or atmospheric gases that permeate through the fuel cell or other byproduct gases, within fuel cell to be vented. As shown, a pressure from gas buffer 40 and/or from purge valve 44 is communicated to switch 48 to automatically activate auxiliary load 46. Alternatively, pressure sensors can be provided between gas buffer 40/purge valve 44 to trigger switch 48 to active auxiliary load 46. Preferably, the pressure control components are activated in the sequence of first-second-third. However, other activation sequences can also be employed.

Figure 2A:
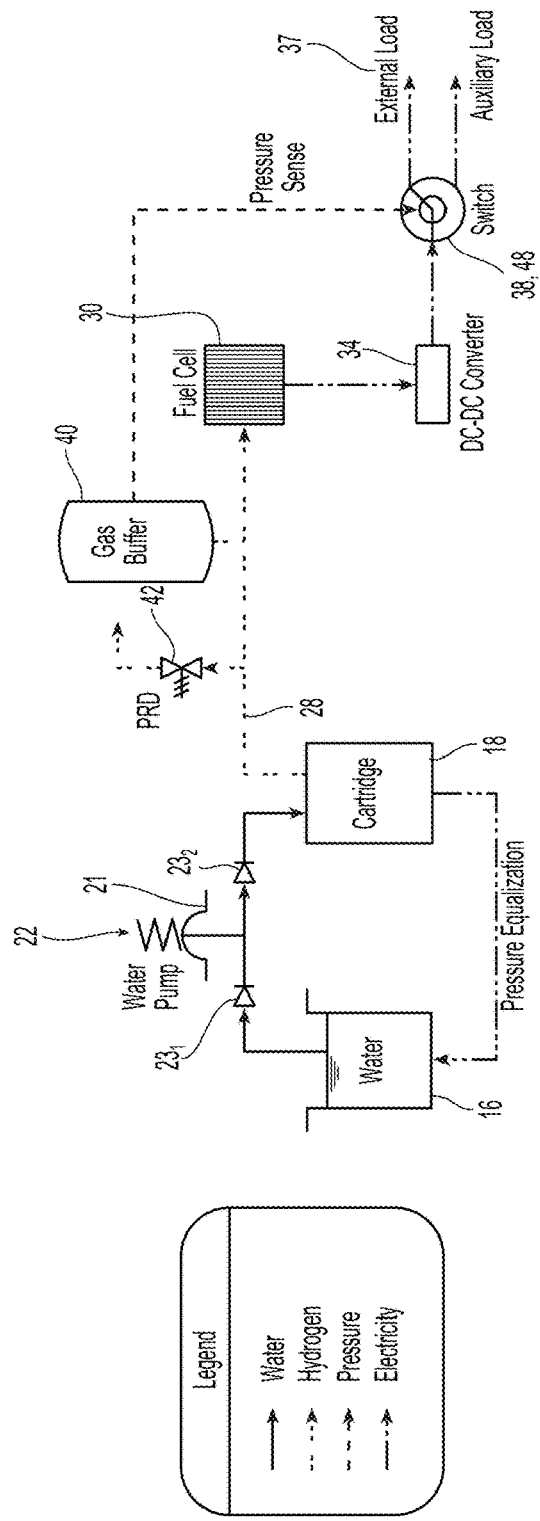
FIGS. 2A-2D are system schematics of other embodiments of the inventive fuel cell system.

FIGS. 2A-2D show system schematics of other embodiments of the present invention. FIG. 2A is presented to show alternatives to FIG. 1. A number of components shown in FIG. 1 are omitted from FIG. 2A for clarity purpose only, and the omitted components can readily be included in the embodiment shown in FIG. 2A. FIG. 2A shows gas buffer 40 upstream of fuel cell 30, similar to that shown in FIG. 1. However, hydrogen gas does not flow through gas buffer 40 to go to fuel cell 30. Instead, gas buffer 40 is connected to switch 38,48 via an optional pressure sensor. Another alternative is that switches 38 and 48 from FIG. 1 are combined into one single switch to activate both auxiliary load 46 and external load 37. Additionally, relief valve 42 is shown instead of burst disc 42.

Figure 2B:
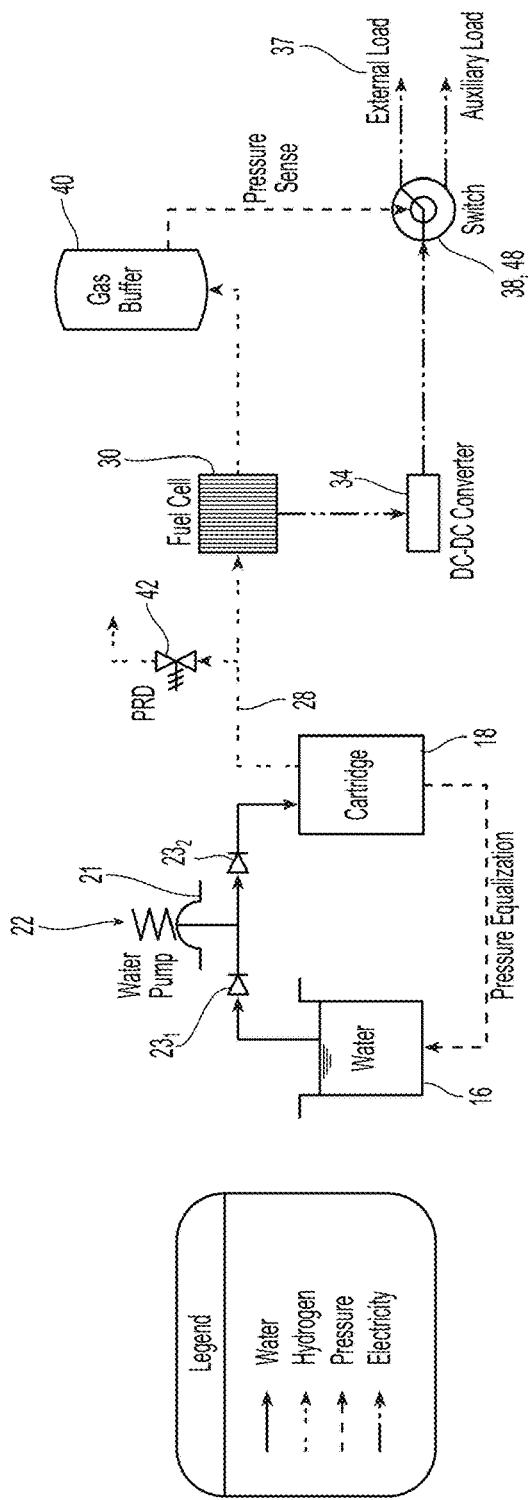

FIG. 2B shows another alternative in that gas buffer 40 is positioned downstream of fuel cell 30. An advantage of this configuration is that excess hydrogen can be stored along with other atmospheric gases that can accumulate within fuel cell 30 during operation to minimize the frequency of purging. Atmospheric gases can be kept in gas buffer 40, or can be vented to atmosphere. Additionally, hydrogen gas stored in the downstream gas buffer may re-enter fuel cell 30, as needed.

Figure 2C:
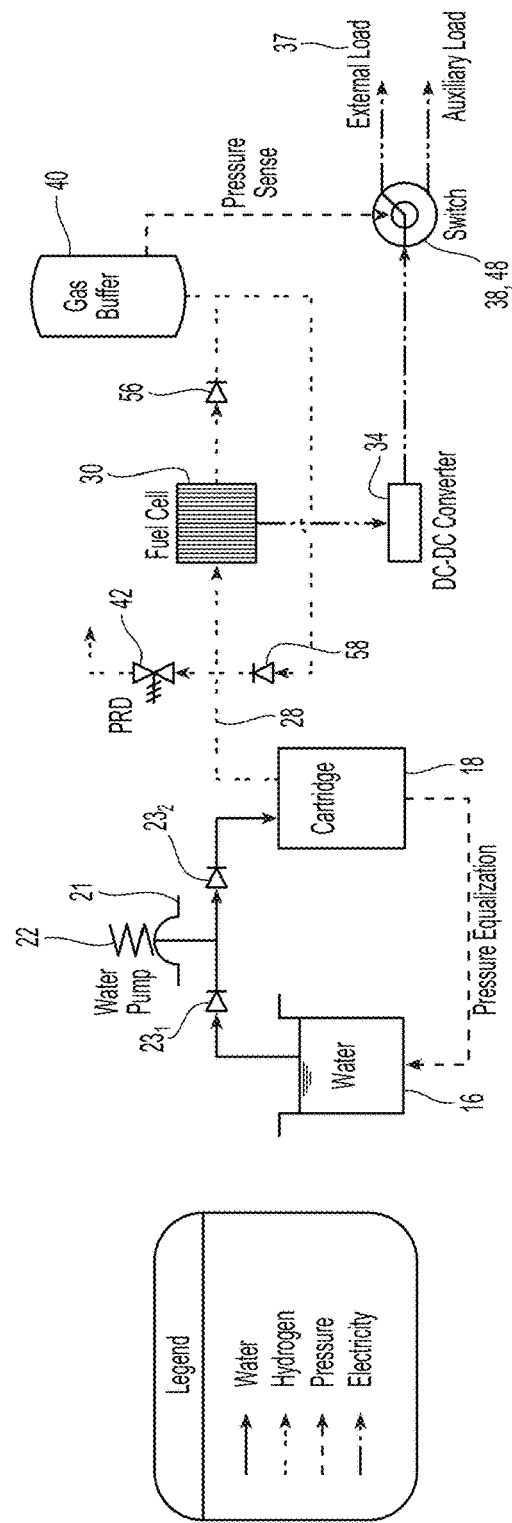
Figure 2D:
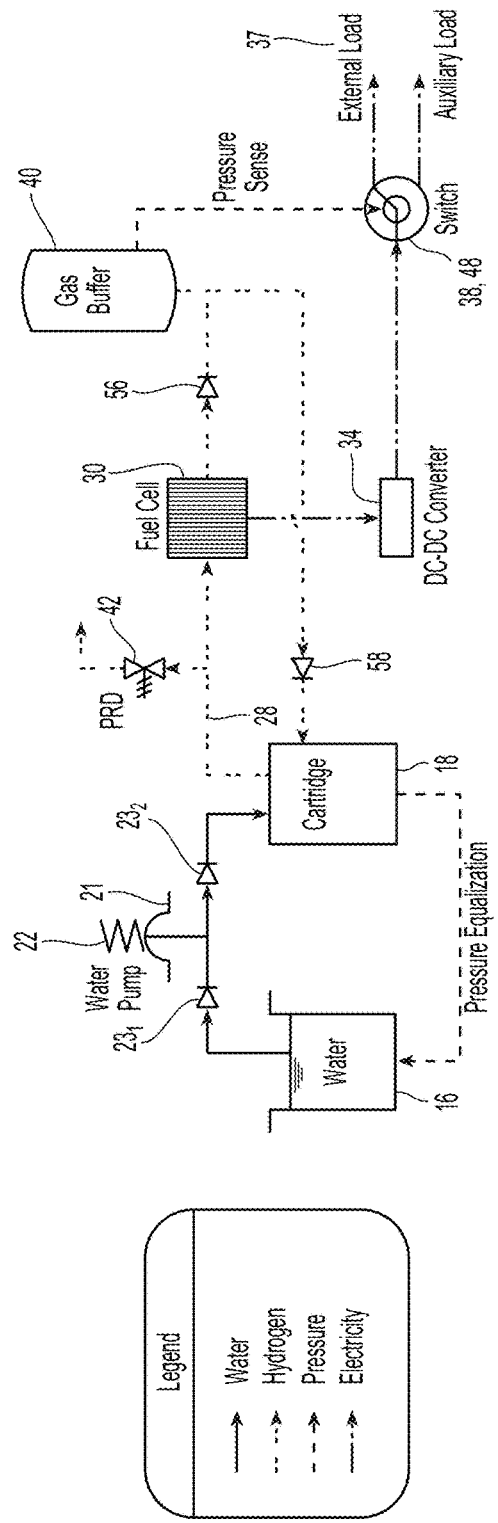

FIG. 2C is similar to FIG. 2B, except that optional check valve 56 may be positioned between fuel cell 30 and gas buffer 40 located downstream of fuel cell 30, so that the hydrogen gas would not flow back into the fuel cell. Additionally, the hydrogen gas stored in gas buffer 40 in this location may be transported back to the inlet side of fuel cell 30 to be consumed. Another optional check valve 58 may be positioned between the inlet side of fuel cell 30 and gas buffer 40 to prevent back flow. FIG. 2D is similar to FIG. 2C, except that hydrogen from gas buffer 40 may be transported back to a cartridge containing solid precursor 18 where the hydrogen generation is taking place.

Figure 3:
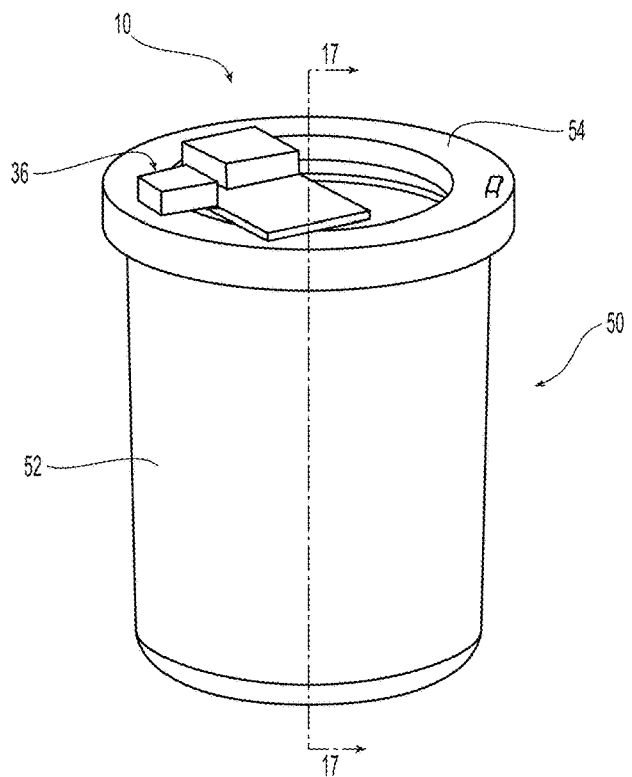
FIG. 3 is a perspective view of an exemplary inventive fuel cell system containing the components shown schematically in FIG. 1, 2A, 2B, 2C or 2D.

Fuel cell system 10 as shown in FIGS. 1 and 2 can be contained in a single housing 50, as best illustrated in FIG. 3, to supply modulated electricity, e.g., 1V, 5V, or 12 Volts DC, to electronic consumer devices. Electricity may be modulated so as to provide voltage and current compatible with USB standards, e.g. USB, USB 2.0, USB 3.0, or any other protocols defined by the USB-IF, for example, or to provide voltage and current compatible with protocols dictated by electronic device manufacturers. Housing 50 may comprise base 52 and cap or lid 54, but may have many configurations or shapes. Fuel cell system 10 can also operate in any orientation, as illustrated in the drawings of the present invention.

An exemplary solid fuel precursor 18 are packaged within fuel cartridge 100 is illustrated in FIGS. 4 and 5A-5G and disclosed in parent U.S. provisional patent application Ser. No. 61/442,043. Fuel cartridge 100 comprises a plurality of segmented fuel compartments or pods with each containing a fuel pellet. Segmented fuel compartments confer several advantages over un-segmented fuel compartments. One is that the generation of byproducts or spent fuel lengthens the flow path for liquid precursor 16 to reach fresh or un-reacted fuel in un-segmented fuel compartments. In the various embodiments of fuel cartridge 100 discussed below after a segmented compartment is fully reacted, liquid precursor 16 bypasses that compartment and proceeds to the next-in-line compartment. Additionally, fuel byproducts may retained liquid precursor 16 and if not isolated or segmented from the remaining un-reacted fuel the trapped liquid precursor may migrate to fresh solid precursor 18, when fuel cell system 10 is turned OFF, to continue to produce hydrogen.

Embodiments of cartridge 100 relate to segmented fuel cartridges that provides control of flows of reactant fluid to discrete fuel elements or fuel portions. The fluid reacts with the discrete fuel portions to product hydrogen gas. As the fluid-fuel reaction proceeds, solid and liquid waste materials are created and provide a feedback mechanism that reduces or stops the flow of reactant fluid to the next-in-line portion of fuel.

Figure 4:
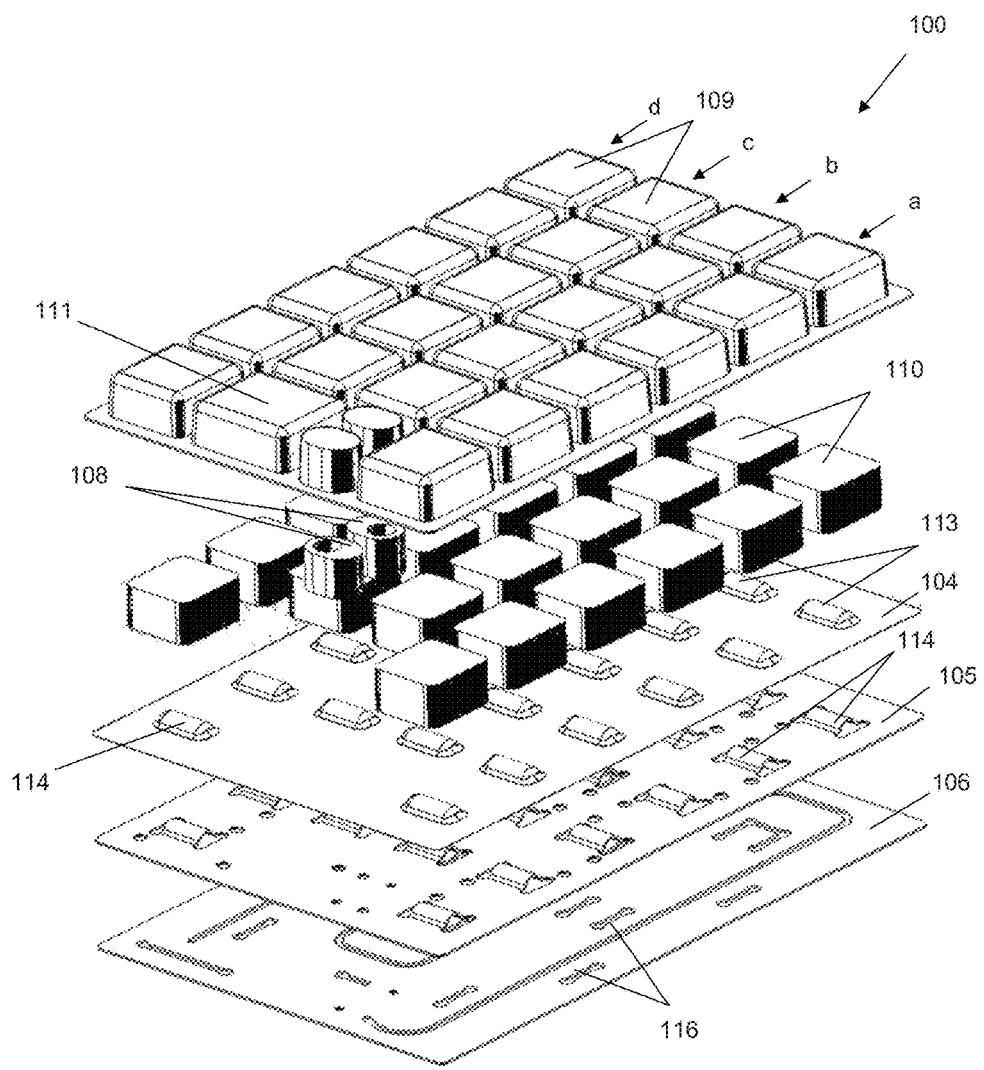
FIG. 4 is an exploded view of an exemplary inventive fuel cartridge.

As shown in FIG. 4, cartridge 100 comprises cup layer 102, filter layer 104, valve layer 105 and flow manifold layer 106. Ports 108 are provided; one port is a liquid inlet for liquid precursor 16 such as water and the other port is a hydrogen outlet. Cup layer 102 comprises a plurality of pockets or cups 109. Each cup 109 sized and dimensioned to receive a fuel pellet 110. Fuel pellets 110 may expand after reacting with water or other liquid precursor to as much as 300% of its original volume or more. Hence, cups 109 preferably have volume capacity to absorb the expansion, and more preferably to save space cup layer 102 is preferably made from an elastomeric material such as silicon rubber or thermoplastic polyurethane (TPU), among other suitable materials, to expand to accommodate the expanding fuel. Cup layer 102 and cups 109 can also be made from a flexible material or a folded material that is not necessarily elastomeric. The direction and amount of expansion of cup layer 102 should be balanced so that the flow channels and valves within cartridge 100 are not negatively affected. The suitable materials should also be able to handle the expected temperature rise due to the exothermic nature of the reaction between liquid precursor 16 and solid precursor 18.

Figure 5A:
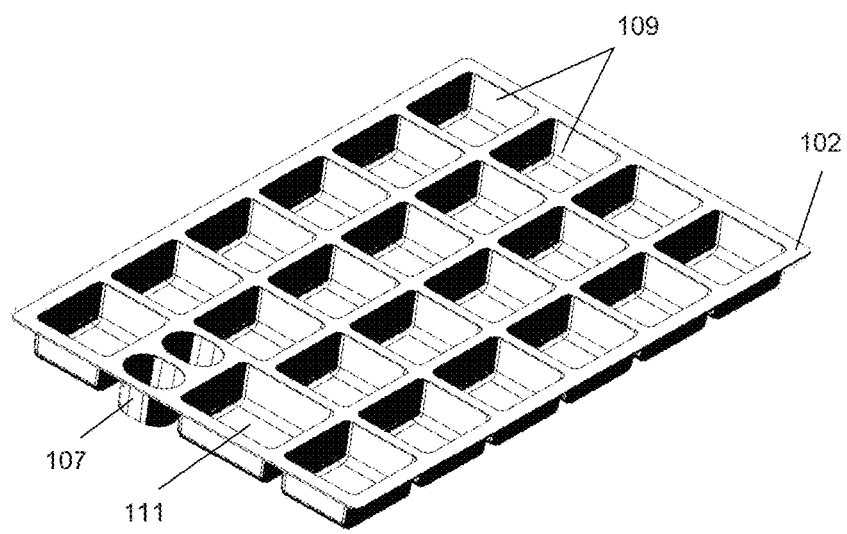
FIGS. 5A-5F are perspective views of the components shown in FIG. 4.
Figure 5B:
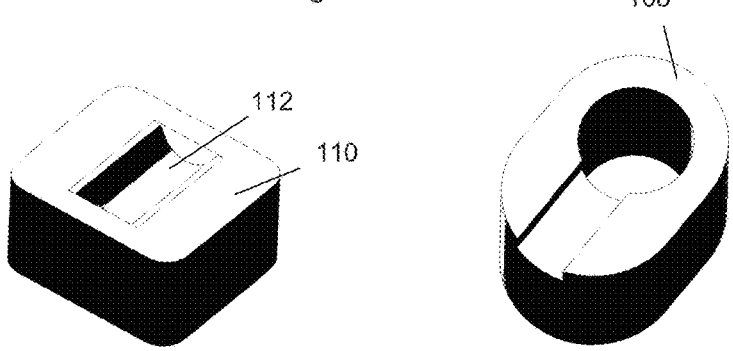

An advantage of providing discrete individual fuel pellets 110 is that discrete fuel pellets allows a control of the volume and rate of hydrogen generation. The size of each fuel pellet should be large enough to generate hydrogen at desired rate(s), and sufficiently small so that changes in the system's dynamics should be minimal and the potential for generating unwanted or excess hydrogen is reduced to an acceptable level. In other words, the fuel pellet should be large enough to generate sufficient amount of hydrogen and yet small enough so that the first dose and the last dose of liquid precursor 16 reach fresh, un-reacted solid precursor 18 within the same fuel pellet 110 at substantially the same time. When hydrogen is no longer needed, residual liquid precursor 16 may continue to react with an individual fuel pellet 110, 18 and the reaction would be contained to that individual fuel pellet. The excess hydrogen would then be stored within gas buffer 40, be converted to electricity by fuel cell 30 which is used or stored in auxiliary load 46. A single fuel pellet 110 is shown in FIG. 5B with a divot 112 on its bottom surface which faces valve layer 105. Divot 112 is sized and dimensioned to receive valve 114 on valve layer 105, discussed below.

Figure 5C:
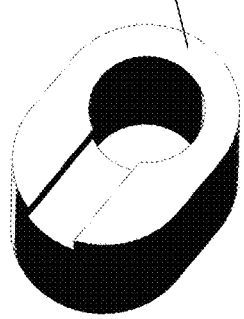
Figure 5D:
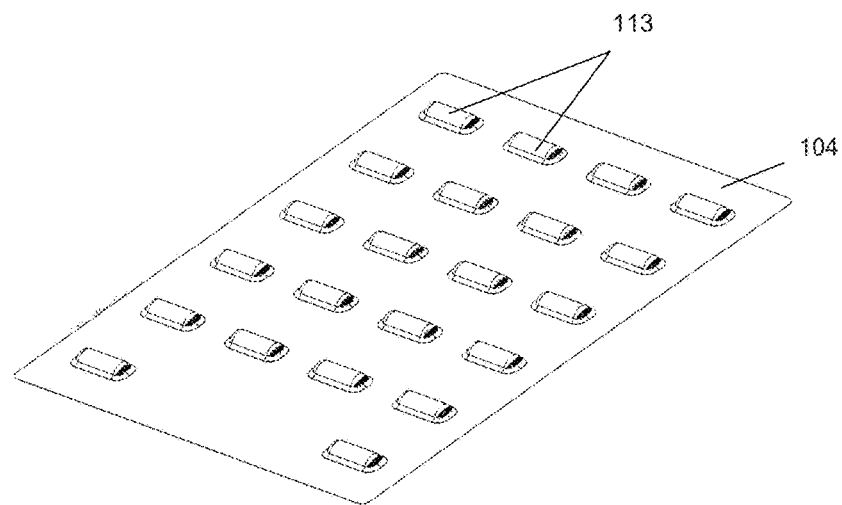

Cup layer 102 also has covers 108c to cover corresponding ports 108, which is also shown in FIG. 5C. Preferably, covers 108c are pierce-able or frangible, so that a user may puncture covers 108c to access the ports for liquid precursor 16 to ingress cartridge 100 and for hydrogen to egress cartridge 100. Cup layer 102 also has pod 11 to house a desiccant, ammonia getter/scrubber and the like to remove water/water vapor, ammonia or other contaminants. Water or water vapor trapped in cartridge 100 would react with fuel pellets 110 to produce gas that may pressurize cartridge 100 while not in use. For certain solid precursors, they are manufactured in an inert nitrogen environment and residual nitrogen may form ammonia in cartridge 100. Ammonia can negatively affect fuel cells and may be removed, if present, from the product gas stream. Suitable desiccants include drierite, which is a form of calcium sulphate, molecular sieves and silica gel. Some desiccants such as these may also attract ammonia. Depending on the type of fuels used, other types of scavenger compounds can be included in pod 111. Suitable scavengers are disclosed in published U.S. patent application no. 2007/0077480 and U.S. Pat. No. 7,655,331. These references are incorporated herein by reference in their entireties.

Below cup layer 102 and fuel pellets 110 is optional filter layer 104, which would contain any debris from fuel pellets 110 or byproducts produced by the reacted fuel pellets. Preferably, filter layer 104 is thin and conformable. Filter layer 104 is preferably hydrophilic and wicks liquid precursor 16 toward fuel pellets 110. Similar to divots 112 on fuel pellets 110, filter layer 104 also has bubbles 113 to accommodate valves 114. In an alternative embodiment, fuel pellets 110 has wicking elements, such as fibers, incorporated therein to wick and distribute liquid within the fuel pellets. In another alternative embodiment, filter layer 104 is omitted and each fuel pellet 110 is individually wrapped with a similar filter material.

Below fuel pellets 110 is valve layer 105, which contains a number of valves 114 that correspond to the number of fuel pellets 110. Valve 114 as shown is in an open configuration and allows liquid precursor 16 to enter cup 109 to react with fuel pellet 110. When fuel pellet expands, up to 300%, the expansion closes valve 114 to stop the ingress of the liquid precursor. Preferably valve 114 is a flapper valve and valve 114 and valve layer 105 are made from a liquid impermeable material.

Figure 5E:
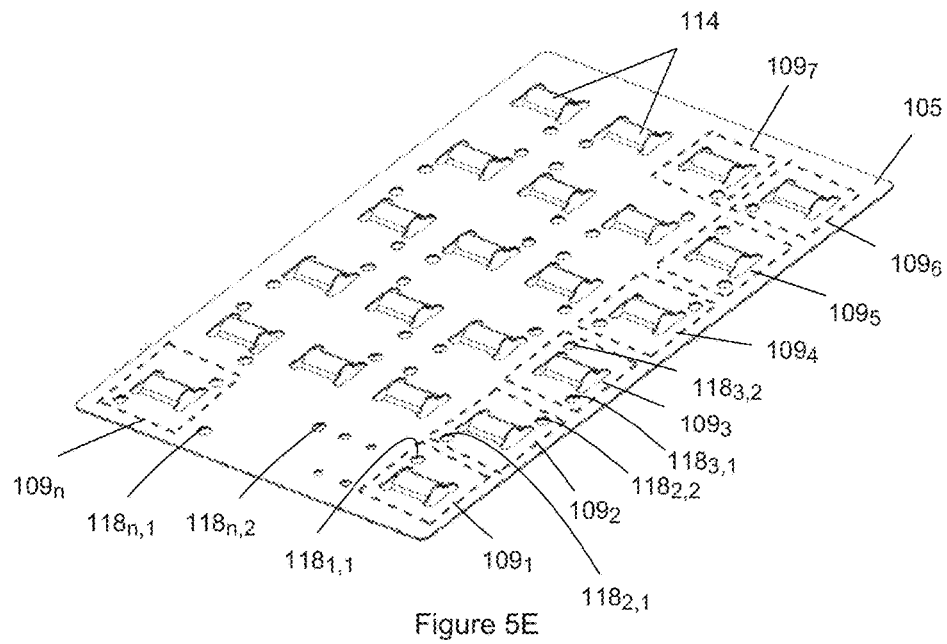
Figure 5F:
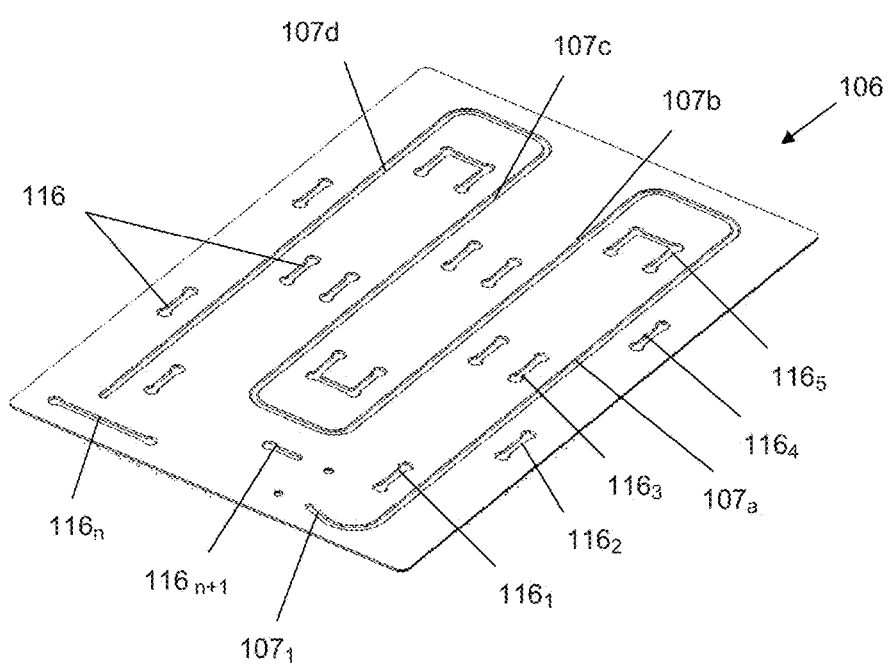

Below valve layer 105 is flow manifold layer 106, which in this embodiment contains a continuous liquid channel 107 and a number of discrete gas channels 116 substantially alternating on either side of liquid channel 107, as best shown in FIG. 5F. It is noted that liquid channel 107 and discrete gas channels 116 are etched or cut into flow manifold layer 106, but do not cut through layer 106. In this embodiment, liquid channel 107 runs under valves 114 and has a serpentine shape and four branches 107a-d. Branch 107a runs directly under row "a" of fuel pellets 110; branch 107b runs directly under row "b" of fuel pellets 110, and so on. Rows "a" to "d" of fuel pellets 110 are best shown in FIG. 4.

The liquid precursor and hydrogen gas flow regimes are described below in connection with valve layer 105 and flow manifold layer 106 shown in FIGS. 5E and 5F. The approximate locations of a row of cups 109 on cup layer 102 are superimposed in broken lines on valve layer 105. The head $107_1$ of liquid channel 107 is aligned with liquid port 108. Liquid precursor 16 is pumped or otherwise transported to head $107_1$ and flows into branch 107a. Liquid channel 107 is preferably hydrophobic to discourage the flow of liquid. The hydrophobicity of liquid channel 107 increases the surface tension between the liquid precursor and the inner wall of liquid channel 107, thereby increasing the force necessary to push the liquid precursor forward.

When the liquid arrives under first fuel pellet 110 in cup $109_1$, the flow path through first valve 114 and filter layer 104 is hydrophilic due at least to the hydrophilicity of filter layer 104 and to the hydrophilicity of certain type of fuel pellets, such as magnesium, additives (e.g., iron, silicon and salts). The hydrophilicity of this path present less resistance to the liquid than liquid channel 107, and the liquid preferentially enters cup $109_1$ to react with fuel pellet 110. Reacted fuel pellet 110 expands, as discussed above, and closes valve 114 to stop the ingress of liquid into the reacted fuel pellet in cup $109_1$. Furthermore, for certain fuel, such as magnesium, additives (e.g., iron and silicon) and water, the spent or reacted fuel becomes more hydrophobic further deterring liquid from ingressing into cup $109_1$. Thereafter, the liquid precursor preferably proceeds to the next-in-line fuel pellet inside cup $109_2$ to react with that pellet, and so on. After the fuel pellet within cup $109_7$ is reacted, liquid branch 107a turns and becomes liquid branch 107b to deliver liquid precursor 16 to the fuel pellets in row "b", and so on.

Produced hydrogen follows a different path than that of the liquid precursor. Referring again to FIGS. 5E and 5F, within cup $109_1$ hydrogen exits through hole $118_{1,1}$ to hydrogen channel $116_1$ on flow manifold layer 106. From hydrogen channel $116_1$, hydrogen enters cup $109_2$ through hole $118_{2,1}$ into cup $109_2$ and combines with the hydrogen produced in cup $109_2$, if that reaction has begun. Hydrogen then exits cup $109_2$ through hole $118_{2,2}$ located diagonally opposite from hole $118_{2,1}$ in cup $109_2$ to hydrogen channel $116_2$.

From hydrogen channel $116_2$, hydrogen enters cup $109_3$ through hole $118_{3,1}$ into cup $109_3$. Hydrogen then exits cup $109_3$ through hole $118_{3,2}$ located diagonally opposite from hole $118_{3,1}$ in cup $109_3$ to hydrogen channel $116_3$. This hydrogen flow path repeats until all fuel pellets 110 have been reacted or until the process is stopped by the user. As used herein the (x, y) suffix on holes 118 means that x is the same as the suffix of cup 109 and y is either the first or second hole in a single cup 109. As described above and shown in FIGS. 5E and 5F, hydrogen channels 116 are positioned in an alternate fashion on either side of continuous liquid channel 117 and holes $118_{x,y}$ are located diagonally opposite from each other in a single cup 109. This alternate fashion creates a tortuous path for hydrogen to travel, as well as for liquid precursor 16. Since hydrogen is a gas, this tortuous flow path presents no hindrance. However, for liquid precursor 16 with higher density and viscosity this tortuous flow path discourage liquid from traveling therethrough and help to constrain liquid to travel within liquid channel 107.

At the terminal cup $109_n$, hydrogen is passed through hydrogen channel $116_n$ and up through hole $118_{n,1}$ to pod 111 so that hydrogen passes through the desiccant and scavenger(s) to remove impurities. Hydrogen then exits pod 111 through hole $118_{n,2}$ to final hydrogen channel $116_{n+1}$ to exit cartridge 100 through post 108 and to fuel cell 30 or to gas buffer 40, as illustrated in FIGS. 1 and 2.

Advantageously, reacted solid precursor 18 or fuel pellets 110 can act as a sponge for the liquid reactant, and so the amount of residual liquid precursor 16 in the system is proportional to the amount of spent, reacted solid fuel precursor. By segmenting the cartridge and isolating the pellets using the described valve arrangement, trapped liquid precursor 16 in spent pellets 110 is prevented from migrating and slowly reacting with unspent pellets.

Layers 102, fuel pellets 110, desiccants/scavenger(s), filter layer 104, valve layer 105 and flow manifold layer 106 are bonded together into a single cartridge 100 by heat seal, ultrasonic welding or adhesives. Preferably, if the layers include TPU then the layers can be bonded by solvent bonding, and if the layers include silicon rubber, then uncured silicon rubber can be used as adhesive and then cured. Preferably, cartridge 100 is inserted into an airtight bag and vacuum sealed.

Figure 7A:
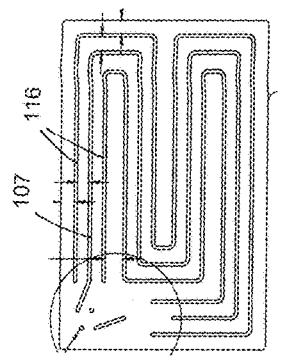
FIGS. 7A-7B are a front view and a perspective view of selected components shown in FIG. 6, respectively.
Figure 7B:
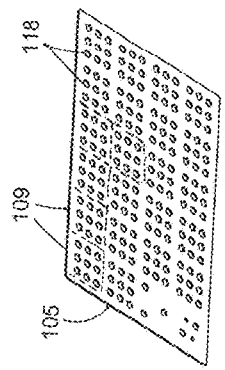
Figure 6:
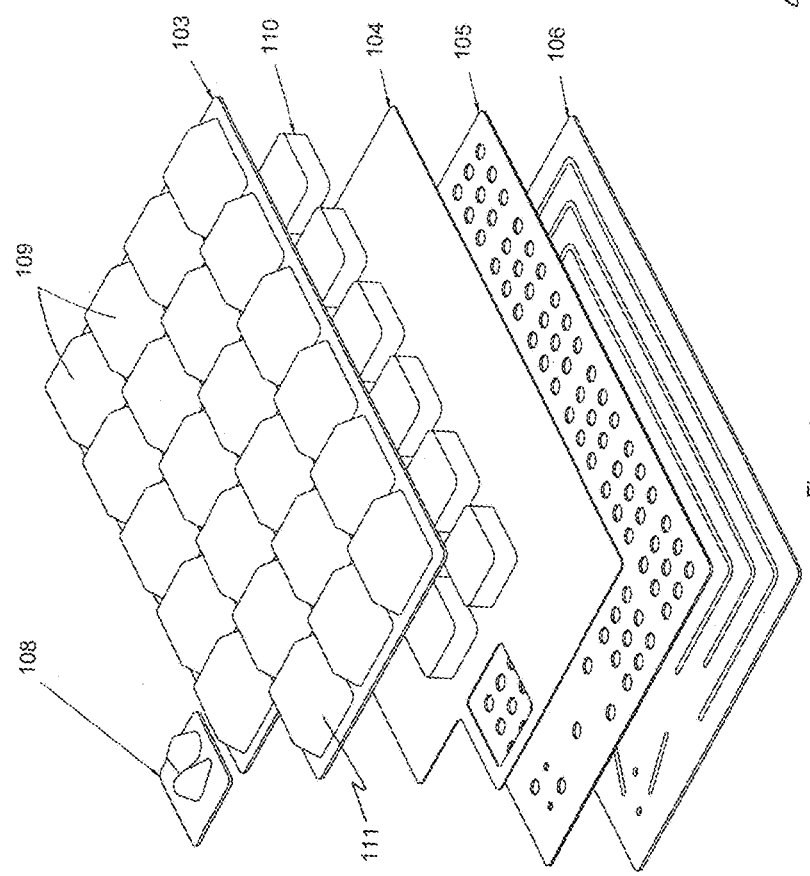
FIG. 6 is an exploded view of another exemplary inventive fuel cartridge.

Another embodiment of fuel cartridge 100 is shown in FIGS. 6 and 7A-7B. The main differences between this embodiment and the embodiment shown in FIGS. 4 and 5A-5G are that valves 114 are omitted and the tortuous hydrogen channels have been simplified. As illustrated in FIG. 6, fuel cartridge 100 comprises cup layer 102 with cups 109 containing fuel pellets 110, optional filter layer 104, layer 105 without valves and flow manifold layer 106. Since there are no valve 114, fuel pellets 100 do not contain divot 112 and filter layer 104 does not have bubbles 113. Flow manifold layer 106 contains continuous liquid channel 107 that tracks the rows of fuel pellets 110 similar to that in the previous embodiment. This flow manifold layer 106 has two continuous hydrogen channels 116—one on each side of liquid channel 107—as best shown in FIG. 7A. Layer 105 contains a plurality of holes 118 to allow liquid precursor 16 and hydrogen to pass through. In this embodiment, a matrix of 3×3 holes 118 underlie one cup 109, as best shown in FIG. 7B. The flow of liquid precursor 16 through flow manifold layer 106 is controlled by the pumping rate of pump 22, the hydrophobicity of liquid channel 107, the hydrophilicity of the un-reacted fuel pellets 110, the expansion of reacted fuel pellets 110 to plug the 3×3 matrix of holes 118 in each cup 109, and the relative hydrophobicity of certain type reacted fuel pellets.

Figure 8A:
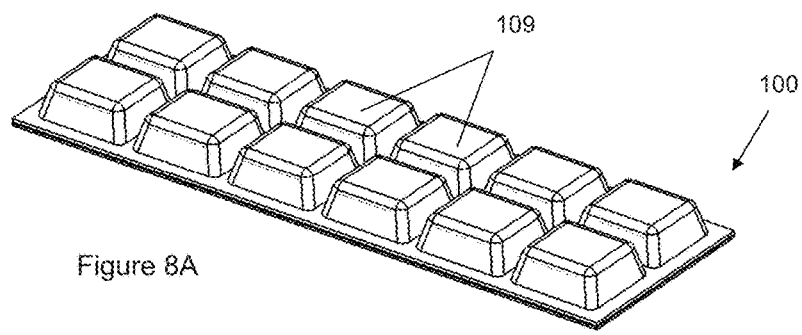
FIGS. 8A-8F show alternative fuel cartridges.
Figure 8B:
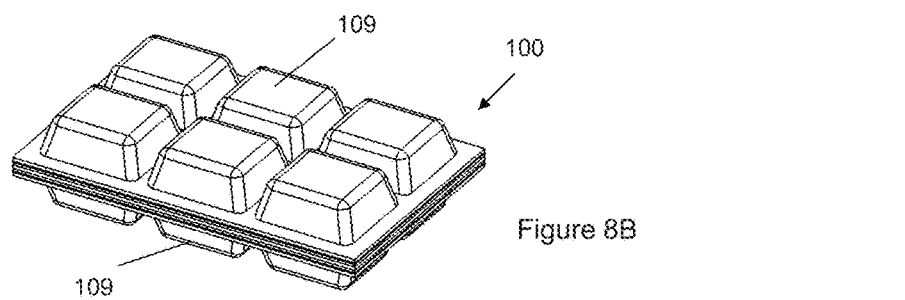
Figure 8C:
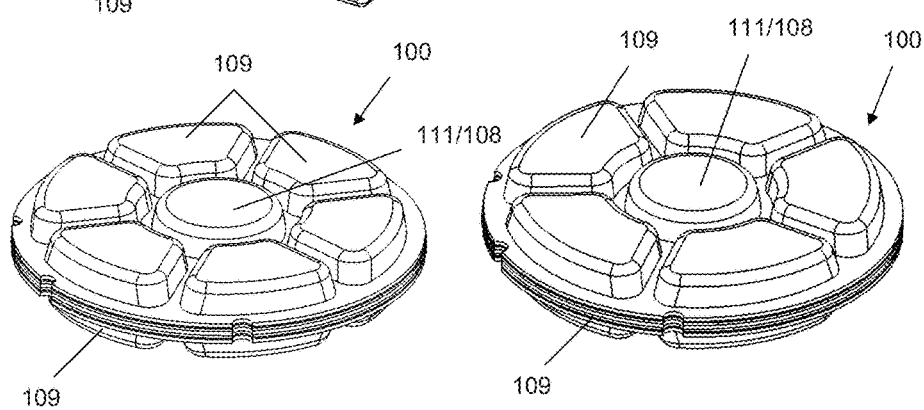
Figure 8D:
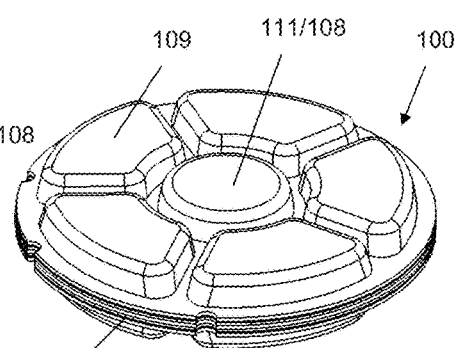
Figure 8E:
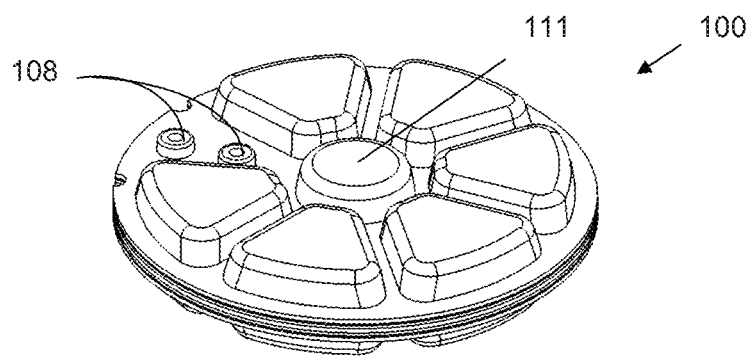
Figure 8F:
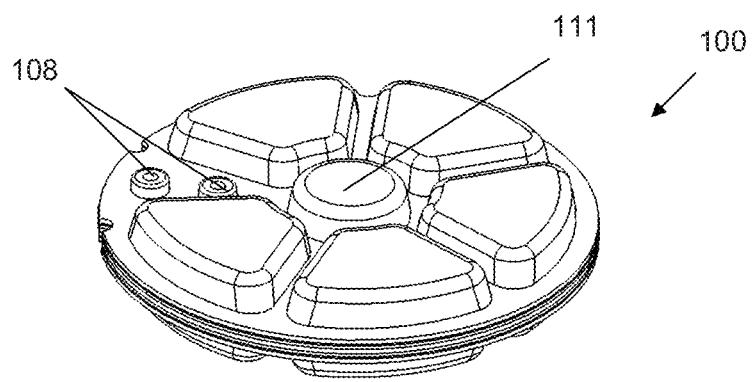

Cartridge 100 may have other embodiments and configurations. FIGS. 4-7 show cartridges 100 with an array of 4×6 fuel pellets 110 positioned on one side of flow manifold layer 106. However, cartridge 100 may have any "m×n" fuel pellets 110 where "m" and "n" can be any integer, as shown in FIGS. 8A-8B. Cartridge 100 may be reduced in size and in the number of fuel pellets in order to reduce the size of fuel cell system 10. Additionally, one array of fuel pellets 110 along with a layer 105 can be deployed on each side of flow manifold layer 106, as best shown in FIG. 8B, where the 2×6×1 array of FIG. 8A is reduced to an array of 2×3×2. Moreover, fuel pellets 110 do not have to be positioned in a two-dimensional array, but can be arranged in any configurations, such as daisy-wheel, spiral, concentric circles, etc. FIGS. 8C and 8d show cartridge 100 having six and five cups 109, respectively, surround pod 111 containing the desiccant/scavenger(s) and ports 108. The different number of cups 109 shown in FIGS. 8C and 8D (five versus six) show a balance between a larger amount of fuels in the five cup configuration and a better control of hydrogen production by the smaller size of the fuel pellets in the six cup configuration. FIGS. 8E and 8F are similar to FIGS. 8C and 8D, respectively, except that ports 108 are separated from pod 111. The present invention is not limited to any particular configurations of fuel pellets 110.

As discussed above, fuel pellets 110 may expand after reacting with water or other liquid precursor to as much as 300% of its original volume or more, and cup 109 and cup layer 102 can be made from an elastomeric or expandable material to handle the expansion, as shown in FIGS. 9A and 9C. As fuel expands, some of its expansion energy may be used to stretch an elastomeric cup 109 or layer 102, and the stretched elastomeric material in turn would apply a counter-force on fuel pellet 110. This counter-force may prematurely close valves 114 shown in FIG. 5E, or may prematurely close holes 108 shown in FIG. 7B. In an alternative embodiment, cup 109 and cup layer 102 may have one or more folds, as best shown in FIG. 9B. When spent fuel pellet 110a expands, folds 130 straighten out to absorb the expansion of the spent fuel. Since cup 109 is not stretched it does not apply a force on valves 114 or holes 108, thereby allowing timely closure of valves 114 and holes 108. Folded cups 109 can advantageously made from non-elastomeric materials that are less permeable to hydrogen gas or other gases, or materials that are more temperature resistant or that have higher glass transition temperatures or melting points.

In another alternative embodiment, normally closed valves usable in fuel cartridge 100 are as shown in FIGS. 10A and 10B. Valves 114 on valve layer 105, as best shown in FIG. 5E, are normally open valves. In other words, valves 114, which are shown as flapper valves, are open to fluid flow until they are shut by the expanding reacting/reacted fuel pellets 110. This may allow liquid precursor 16 to flow into the next cup 109 to react the next-in-line fuel pellet(s) 110 prematurely.

Referring to FIG. 1 OA, which illustrates the daisy-chain configurations of cartridge 100 shown in FIGS. 8C-8F, each cup 109 is connected by liquid channel 122 to a main manifold. Within each liquid channel 122, a temporary blockage 124 is positioned to block the flow of liquid to cup 109 until blockage 124 is removed. In one embodiment, blockage 124 is made from a wax or any material that melts with the application of heat or electricity or the like. As shown, liquid channels 122 associated with spent fuel pellets 110a have been opened with blockages 124 removed. A controller can be provided to have access to all blockages 124 and can directly remove each blockage individually by sending electrical current to a blockage when access to cup 109 corresponding to said blockage is needed. In an alternative embodiment, one channel 122 is unblocked at all times so that as soon as the flow of the liquid precursor is initiated the liquid is allowed to enter one cup 109 to start the reaction. Since such reactions are exothermic, heat builds up in cup 109. A thermal conductor made from a thermally conductive material such as metal can connect the reacting fuel pellet to blockage 124 on the next-in-line fuel pellet to be reacted. The thermal conductor is designed such that when a maximum temperature is reached in the reacting fuel pellet, the thermal energy is conducted to blockage 124 on the next-in-line fuel pellet to melt said blockage. In this fashion, when one fuel pellet is depleted or substantially depleted, the next fuel pellet is prepared to receive the liquid precursor to react to maintain a satisfactory stream of produced hydrogen. The thermal conductors can be positioned within cartridge 100 or on the outside surface of cartridge 100 or both.

FIG. 10B is another embodiment of a cartridge 100 with normally closed valves. This embodiment is similar to the embodiment of FIG. 10A, except that blockages 124 are replaced by rotating gate 126. As shown, rotating gate 126 has an opening that is sized and dimensioned to align with a single fluid channel 122. To start the reaction, gate 126 is initially aligns with one liquid channel 122. As the reacting fuel pellet expands, it also pressurizes the walls of its cup 109. This expansion, which translates to a movement, can be used to trigger an indexing mechanism. Additionally, pressure can also be used to rotate or to index gate 126 to align with liquid channel 122 of the next-in-line fuel pellet 110. A number of pressure-sensitive indexing mechanisms capable of rotating or moving rotating gate 126 is disclosed in published U.S. patent application 2008/0206113. This reference is incorporated herein by reference in its entirety. In this fashion, each cup 109 and its fuel pellet 110 is sequentially reacted similar to the embodiment shown in FIG. 10A.

Figure 11A:
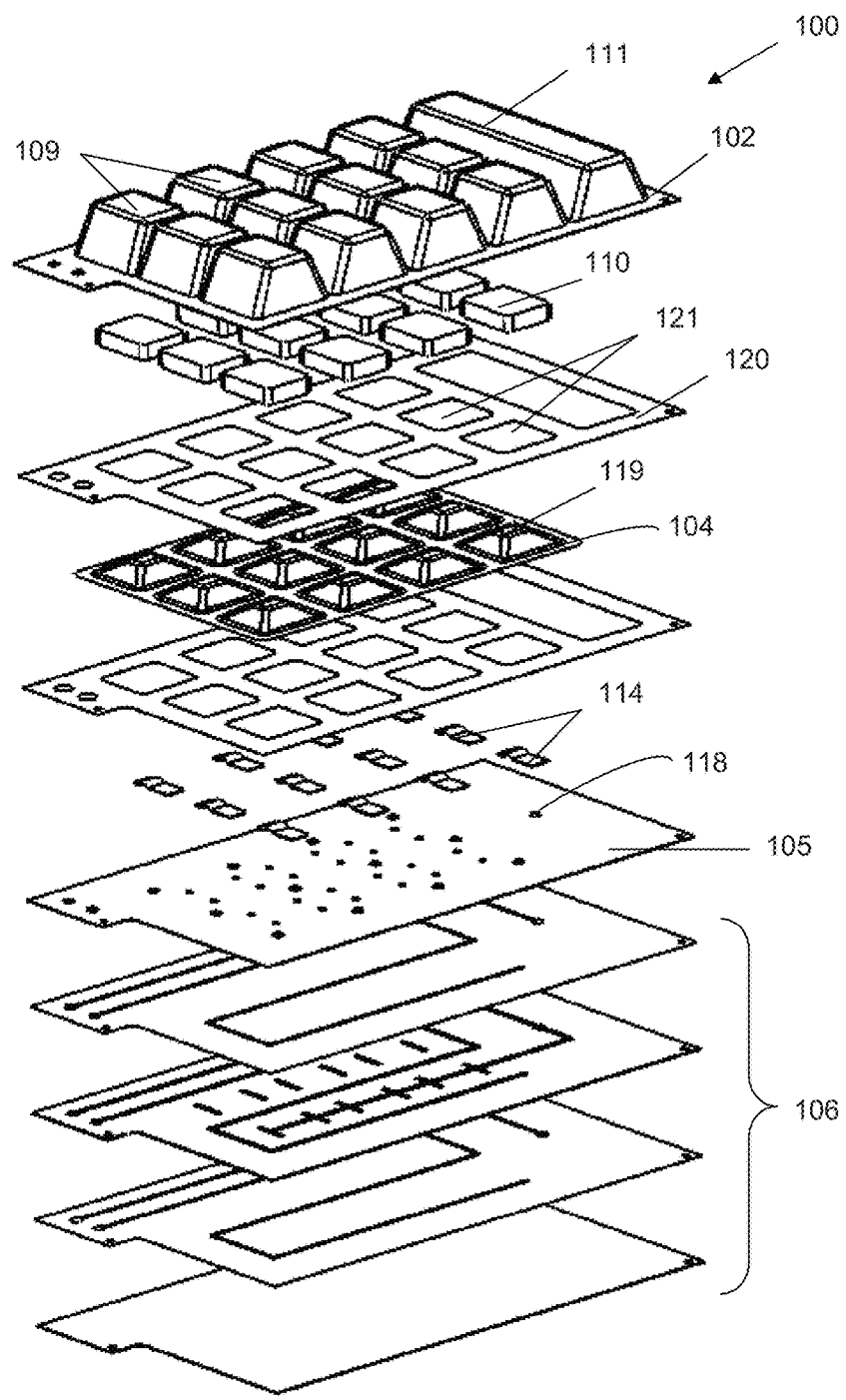
FIGS. 11A, 11B and 12 are exploded views of alternative fuel cartridges.
Figure 11B:
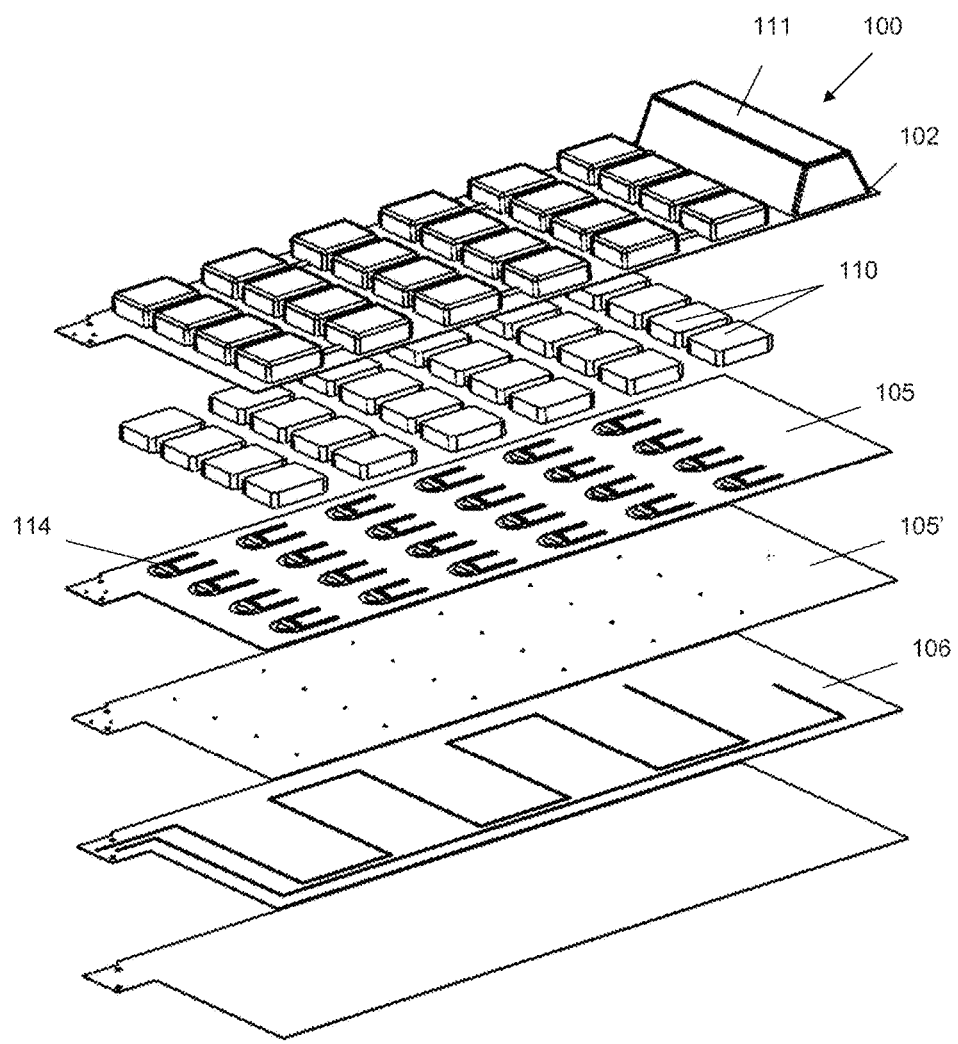
Figure 12:
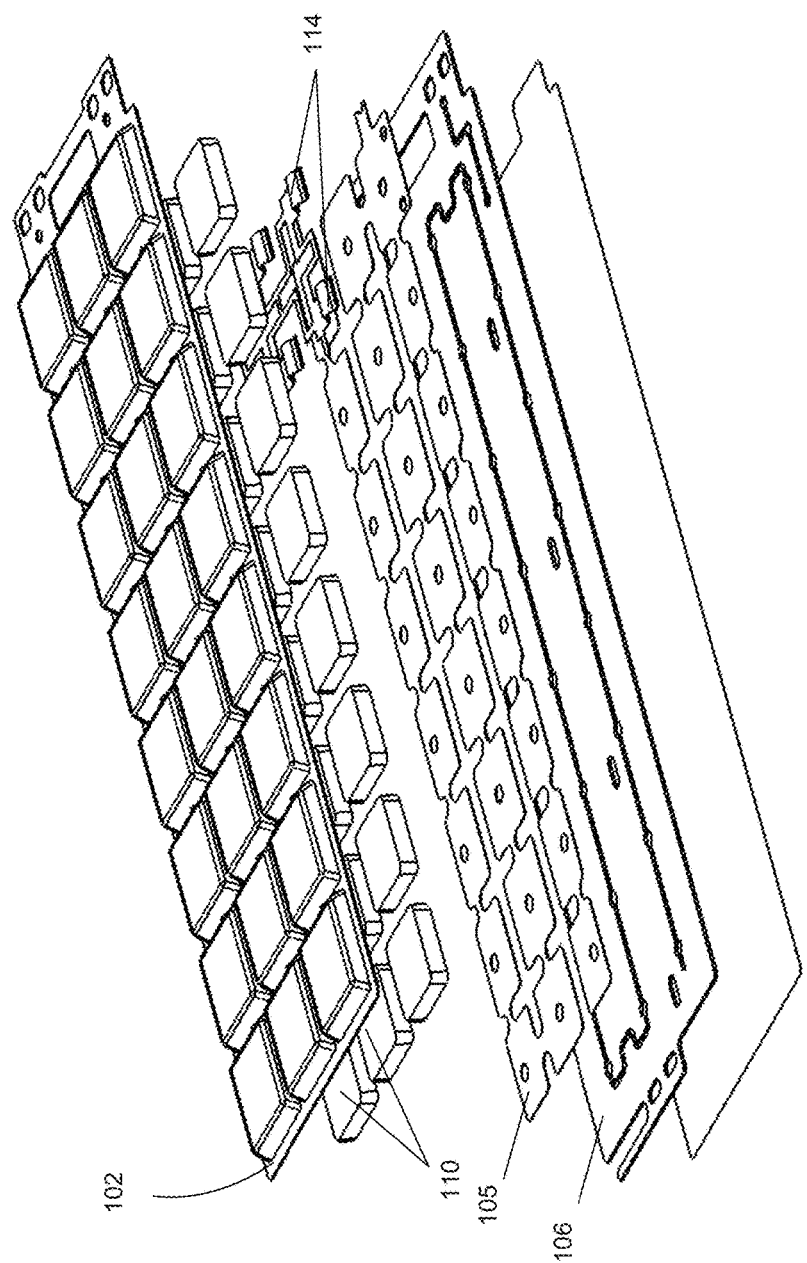

Other embodiments of cartridge 100 are shown in FIGS. 11A, 11B and 12. In FIG. 11A, cartridge 100 also comprise valves 114 which can be separated from layer 105, which comprises liquid and gas passage holes 108. Cups 109 are relatively larger than fuel pellet 105 so that cups 109 have room for the expansion of the fuel pellets. Filter layer 104 has protruded supports 119 to provide clearance around the valves. Filter layer 104 is held between two optional adhesive layers 120 having holes 121 that correspond to protruded supports 119. Flow manifold layer 106 in this embodiment comprises multiple layers including adhesive layers to bond the all the layers together. This cartridge 100 may also have pod 111 containing desiccants and scavengers, or pod 111 may contain a water trapping mechanism described below as element 604.

FIG. 11B shows another embodiment similar to that of FIG. 11A, except that there is no filter layer 104, and that valve layer 105 has valves 114 built thereon, and that the flow holes are on a separate layer 105'. FIG. 12 shows another embodiment of cartridge 100 that has valves 114 in clusters, and one of which is shown in FIG. 12.

A preferred fuel is magnesium, which reacts with an aqueous electrolyte to corrode magnesium and form hydrogen plus magnesium hydroxide.

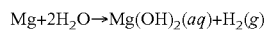

However, when magnesium reacts with brine water, the rate of hydrogen production is low and as the reaction proceeds it raised the pH of the solution to a point where the reaction effectively stops. Without being bound to any particular theory, it is believed that silicon can produce hydrogen from an alkaline solution. When silicon, preferably in the crystalline form, is added to the magnesium brine solution, the solution is capable of producing additional hydrogen. It is believed that at certain level of alkalinity (pH of greater than about 7) silicon reacts with the hydroxyl species lowering the pH level and facilitating the continuing corrosion of magnesium in brine water. Silicon itself may also release additional hydrogen from water by reacting with magnesium hydroxide to form magnesium silicates and additional hydrogen gas. Crystalline silicon have sufficient degree of crystallinity such that crystalline silicon is essentially unreactive in neutral aqueous solution (pH of about 7).

The present inventors also discovered that when iron particles of certain sizes are added to the magnesium particles or magnesium/silicon mixture, the rate of the hydrogen evolution increases. As shown in the experimental results reported below, increasing reaction rates or corrosion rates can be realized when the magnesium particle sizes are significantly higher than the sizes of the iron particles and/or the sizes of the silicon particles. Without being bound to any particular theory, it is believed that the enhanced reaction rate is the result of iron and magnesium particles intimately contacting each other to create galvanic cells due to the different electrode potential of the metals. The reaction rate may depend on how many iron particles can contact a single magnesium particle. Nickel, copper and cobalt particles can be used with iron or instead of iron.

The present inventors also discovered that the size of the iron particles has an effect on the hydrogen generation rate. Iron particles that passed through a 325 mesh (0.044 mm openings) and through a 200 mesh (0.075 mm openings) were tested with mixtures containing magnesium and silicon. The smaller iron particles that passed through the finer 325 mesh yielded better hydrogen generation rate when reacted with brine solutions.

Milling the magnesium, silicon and iron mixture also has a positive effect on the hydrogen generation rate. It is believed that milling, such as ball milling and attritor milling, enhances the contact between the smaller iron particles to the larger magnesium particles. It is further believed that milling create intimate contact between magnesium, iron and silicon, particularly between magnesium and iron, such that the facile galvanically-driven hydrolysis can occur. Larger iron particles can benefit more from ball milling; however, smaller iron particles may be more beneficial to the hydrogen production rate.

EXAMPLE 1

| Materials | Purity | Particle Sizes |
|---|---|---|
| Magnesium | 99% | between 40 to 100 mesh (422 microns to 152 micron holes) |
| Iron | 98% | Diameter (microns) 4 ≤ 10% 10 < 50% < 25 90% ≤ 45 |
| Silicon | 98% | 325 mesh (44 micron holes) |

In one preferred embodiment, magnesium particles are first sifted through the coarser mesh, e.g., 40 mesh, to remove the larger particles, and then sifted through the finer mesh, e.g., 100 mesh, to remove the smaller particles leaving behind particles in the range between the holes in the coarser mesh and the holes in the finer mesh. Solid fuels were prepared from 100 parts Mg, 25 parts Fe and 15 parts Si by weight. This mixture was milled in an Attritor mill using ⅜ inch carbon steel sphere grinding media. The milling step was conducted in a nitrogen atmosphere for 15 minutes with a 15 minutes discharge. The milling temperature was less than 38° C. (100° F.) and the nominal particle size is about 110 microns. The resulting particles are hybrid or composite particles of magnesium covered by a fine dispersion of silicon and iron.

Figure 13A:
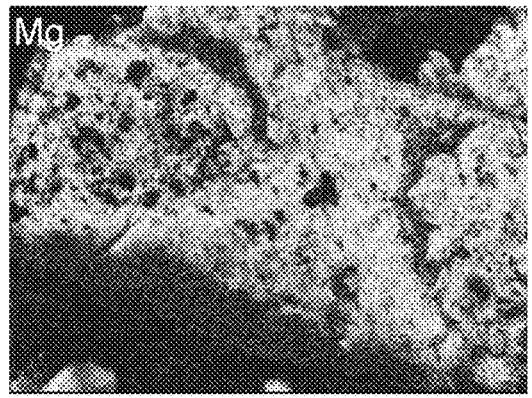
FIGS. 13A-13C are black and white electron micrographs of the inventive fuel.
Figure 13B:
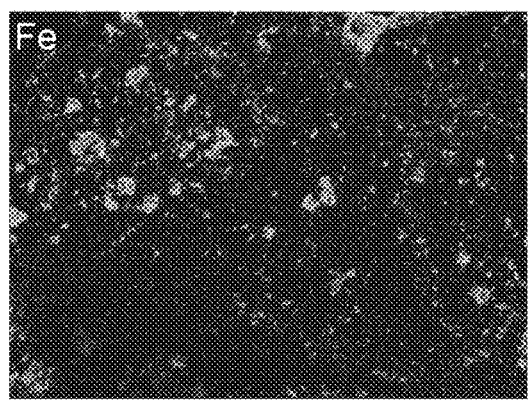
Figure 13C:
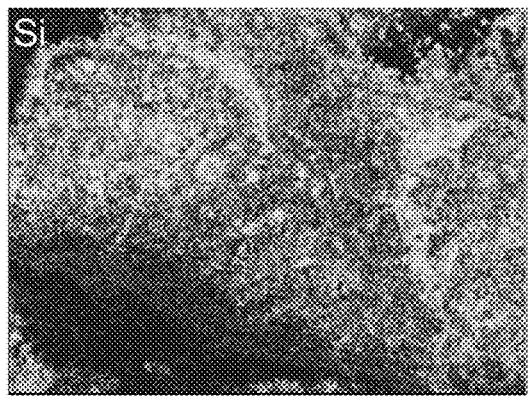

FIGS. 13A-13C are black and white versions of color electron micrographs showing the elemental EDX (energy-dispersive X-ray) map of magnesium particulate covered in a fine dispersion of silicon and iron particles. The contrasts of the color electron micrographs are enhanced to highlight each element. More specifically, FIG. 13A shows the coarser unexpected results for improved hydrogen reaction rates. As used herein, coating may also mean that the smaller particles are attached to or stuck to the larger particles.

The milled hybrid particles in Example 1 may also be formed into pellets, such as fuel pellets 110 discussed above. Salts, such as 1 part sodium chloride (NaCl) and 1 part potassium chloride (KCl), can be added to 9 parts hybrid particles and mixed for about 30 minutes at about room temperature. Pellets, e.g., about 3.26 g, with density of about 1.90 grams/cm$^3$ can be formed under about 18 metric tons (40,000 lbs) of force. The advantages of using KCl and of adding salt to the fuel pellets instead of the liquid precursor 16 are discussed below. It is noted that the materials, such as magnesium, iron and silicon can be alloyed together.

Figure 14:
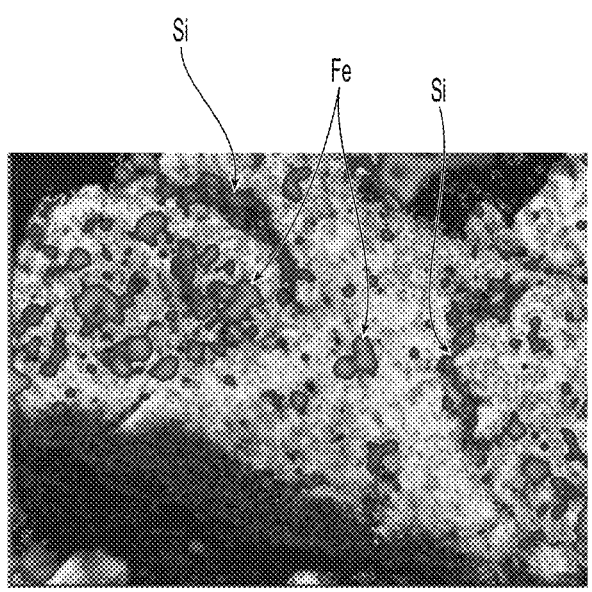
FIG. 14 is a composite black and white electron micrograph of FIGS. 13A-13C overlaid on each other showing the inventive iron and silicon coated magnesium particles and showing hybrid fuel particles with plurality of micro galvanic cells on the surface of the fuel particles.

Test Results:

| Mg (1 g) | Fe (parts) | Si (parts) | NaCl 6 cc (% Sol) | Milled | Total Vol (cc) | Rate (cc/m) | Temp (C.) | Yield (per 1 g Mg) |
|---|---|---|---|---|---|---|---|---|
| Group I. Magnesium with silicon and without iron ||||||||| 
| 100 parts | 0 | 0 | 5% | N | 7.37 | 0.244 | 29 | 0.80% |
| 100 parts | 0 | 15 | 5% | N | 45.8 | 1.97 | 29.8 | 4.97% |
| 100 parts | 0 | 0 | 11% | N | 7.5 | 0.25 | 27.8 | 0.81% |
| 100 parts | 0 | 15 | 11% | N | 73 | 2.45 | 31.3 | 7.92% |
| Group II. Magnesium with silicon and iron with lower brine concentration |||||||||
| 100 parts | 20 | 15 | 5% | N | 973 | 30.38 | 84.52 | 105.51% |
| 100 parts | 5 | 15 | 5% | N | 56 | 3.67 | 31.87 | 6.07% |
| Group III. Varying relative amounts of silicon and iron |||||||||
| 100 parts | 5 | 0 | 5% | N | 48.35 | 6.86 | 29.28 | 5.24% |
| 100 parts | 20 | 0 | 5% | N | 64.27 | 5.28 | 33.02 | 6.97% |
| 100 parts | 10 | 15 | 5% | N | 107.87 | 7 | 35.81 | 11.70% |
| 100 parts | 5 | 30 | 5% | N | 80.4 | 7.12 | 33.21 | 8.72% |
| 100 parts | 20 | 30 | 5% | N | 1006 | 22.35 | 77.47 | 109.09% |
| Group IV. Maintaining iron at 20 parts and varying silicon and brine concentration |||||||||
| 100 parts | 20 | 0 | 1% | N | 58.07 | 4.96 | 32.15 | 6.30% |
| 100 parts | 20 | 15 | 1% | N | 107.7 | 5.16 | 33.19 | 11.68% |
| 100 parts | 20 | 30 | 1% | N | 59.4 | 4.6 | 31.04 | 6.44% |
| 100 parts | 20 | 0 | 5% | N | 114.81 | 5.74 | 35.29 | 12.45% |
| 100 parts | 20 | 15 | 5% | N | 999.9 | 28.39 | 86.12 | 108.43% |
| 100 parts | 20 | 30 | 5% | N | 1143.3 | 27.94 | 83.83 | 123.98% |
| 100 parts | 20 | 0 | 11% | N | 892.4 | 26.16 | 80.84 | 96.77% |
| 100 parts | 20 | 15 | 11% | N | 994.6 | 32.19 | 85.82 | 107.85% |
| 100 parts | 20 | 30 | 11% | N | 1088.5 | 27.2 | 82.74 | 118.03% |
| Group V. Maintaining silicon and brine concentration and varying iron amounts |||||||||
| 100 parts | 15 | 15 | 5% | Y | 1165 | 48.28 | 84.4 | 126.33% |
| 100 parts | 25 | 15 | 5% | Y | 1134 | 76.6 | 90.89 | 122.97% |
| 100 parts | 35 | 15 | 5% | Y | 1135 | 76.06 | 90.2 | 123.08% | magnesium particles, which appear as yellow in the color electron micrographs. FIG. 13B shows the finer iron particles, which appear as green in the color electron micrographs, and FIG. 13C shows the finer silicon particles as blue in the color electron micrographs. FIG. 14 shows a composite black and white electron micrograph with the contrasts for each element re-adjusted so that the iron, silicon and magnesium are all visible.

FIG. 14 shows the coating of iron and silicon fine particles on magnesium resulting in hybrid magnesium/iron/silicon particles. Importantly, FIG. 14 shows that on a single magnesium particle multiple of micro galvanic cells are formed by the iron particles coated on the surface of that magnesium particle. Since iron and magnesium are metals with different electrode potentials their contacts form galvanic cells, which promote corrosion and hydrogen generation. As shown below, these novel hybrid particles provide The iron particles in Groups II-IV are 10 microns in diameter and the iron particles in Group V were passed through a 325 mesh (44 micron holes). Yields greater than 100% indicate that the iron, silicon or salt reacts (or catalyzes the reaction) to hydrolyze water to produce additional hydrogen.

The data shows that in Group I, when only magnesium and magnesium coated with silicon are tested with brine, the stoichiometric yields based on magnesium alone are low, which increase modestly with increasing brine concentration. Group II shows that magnesium particles coated with iron and silicon particles have improved flow rates and stoichiometric yields at moderate brine concentration, but only when the amount of iron particles present is robust, i.e., 20 parts iron versus 5 parts iron. Group III shows that magnesium coated by iron alone also yielded modest results, as well as magnesium coated by both iron and silicon, except when iron is present by 20 parts and silicon is present by 30 parts or by 15 parts (see Group II).

Group IV tests magnesium coated with about 20 parts iron with varying silicon amounts and varying brine concentration. Group IV shows that with low brine concentration (1%), the hydrogen flow rate and yields are modest even with 20 parts iron and 15 or 30 parts silicon. Groups II and III have shown that at 5% brine concentration, magnesium particles coated with 20 parts iron and 15 or 30 parts silicon show good results. Indeed, Group IV confirms this finding at 5% brine concentration, and the results remain substantially the same with 11% brine concentration suggesting that higher brine does not significantly improve the flow rate and yields, except that 11% brine appears to have substituted for the silicon (see 20 parts iron, 0 part silicon and 11% brine).

Group V investigates the effects of milling. The magnesium, iron and silicon particles were milled for about 20 minutes in a planetary mill. The iron particles are passed through a 325 mesh (44 micron holes), which are larger than the 10 micron iron particles used in Groups II-IV. However, the milling step breaks down the iron particles. Group V shows that the flow rate and yields remain similar for varying amounts of irons, i.e., 15 parts, 25 parts and 35 parts. This shows that milling improves the contacts between iron and magnesium creating improved galvanic cells between these particles. Less iron may be used to obtain the same results.

The test results show that hybrid magnesium particles, i.e., coated with finer iron (about 20 parts or higher) and silicon particles (at least 15 parts), improve the reaction rate and yields. Milling the particles improves performance and reduces the amount of iron needed (to about 15 parts of higher). Milling improves the performance because it increases surface area contact between iron and magnesium. The present invention is not limited to magnesium particles coated by finer iron particles, as illustrated in FIGS. 13A-13C and 14. Any two or more metals that form galvanic cells can be used, so long as the two metals are allowed to be in intimate contact with each other, so as to facilitate galvanic corrosion. In one embodiment, any two or more metals that form galvanic cells can be used, and preferably at least one metal is present in larger size particles and the other metals are smaller and coat the larger metal particles.

The above test results also show that temperature of the reaction is a good indicator of the reaction. In other words, reaction temperatures greater than 75° C. indicate efficient reaction.

The present inventors have discovered that milling by ball or attritor mills, discussed above, can improve the contact between magnesium and iron and silicon thereby further improving hydrogen production rates and hydrogen yields.

The advantages of using high brine concentration was also demonstrated with magnesium particles (30-100 mesh or 0.6 mm to 0.15 mm holes and 99.8% grade) with silicon powder (325 mesh or 0.044 mm holes and 99% grade) and without iron powder. The magnesium particles coated with silicon powder was made into pellets with fluoro thermoplastic copolymers, such as polyvinylidinefluoride (PVDF) (Kynar 2851 from Arkema) or polytetrafluoroethylene (PTFE), as binders. The brine solutions were 11% concentration and 5% concentration+1% ethylene glycol. The hydrogen yields were from 65% to as high as 94%, if the reactions were allowed to run from 22 hours to 64 hours.

Magnesium and water based fuels are also disclosed in published international patent application WO 2011/017801 entitled "Hydrogen Generation Using Compositions Including Magnesium and Silicon." This international application is incorporated herein by reference in its entirety.

In accordance to other embodiments of the present invention, salts such as NaCl and KCl can be added as a secondary material to a mixture of solid fuel, e.g., magnesium, and first additives, e.g., iron and/or silicon, instead of adding salt to water to make brine solutions. Parent provisional patent application Ser. No. 61/442,104 discloses such embodiments.

Fuel pellets 110, shown above in FIGS. 4, 5B or 6, are made by compressing a composite solid fuel. Simply compressing this composite powder into a compact pellet can defeat the purpose of forming the fine powder to begin with—the formed pellet may behave more as a solid material, with effectively reduced surface area which retards the hydrogen production reaction. Furthermore, as the pellet breaks down, the exposed surface area can change significantly and lead to undesired variability in rate at which hydrogen is produced. A pellet formed solely from pressed powdered fuel materials may also be prone to disassociation through settling or vibration-induced separation.

The present inventors recognize that blending a secondary material (e.g., one or more types of salt) with a mixture of fuel material can yield a pellet that has many beneficial characteristics, such as improved interaction with a reactant fluid.

By including salt in the fuel pellet itself, however, certain embodiments of this invention eliminate or reduce the need for including a salt in a reactant fluid. Also, including salt can enhance the production of hydrogen because the salt particles in the fuel pellet tend to absorb reactant fluids and draw them into the pellet, creating higher localized brine concentrations of the resulting electrolyte so that the hydrogen-producing reaction can proceed at a greater rate. As shown in the test results discussed above, high concentration of brine, e.g., 11% concentration, can improve the hydrogen production rate. The salt can also act as a pore-forming agent in that it can dissolve upon contact with a reactant fluid and, once dissolved, leave a pore within the pellet that provides a fluid pathway into the interior of the pellet in which additional reactant fluid may flow.

Another advantage of using a secondary material, such as salt, in fuel pellets 110 is that liquid precursor 16 dissolves the salt and is drawn into the fuel pellets and possibly by-passing any outer crust on the fuel pellets formed by reacted fuel. The included salt can act as pore-formation agents in the final compressed pellet. Liquid precursor 16 (e.g., water) dosed onto the surface of the pellet will absorb the salt and be drawn into the interior of the pellet, thereby promoting the hydrogen generating reaction. Often, this causes the fuel pellet to break down into smaller pieces or possibly into the original particulate form of its constituent ingredients which can promote the hydrogen-generating reaction by producing a more thorough contact between the liquid precursor and the constituents of the fuel pellets. In these manners, some of the embodiments of the present invention provide a means of producing a uniform hydrogen generating reaction using only water as the liquid reactant.

Preferably, the present invention includes methods of creating a fuel pellet for use in hydrogen generation systems. In some embodiments, the inventive methods include mixing a particulate fuel material, e.g., magnesium, and at least one first additive, e.g., iron and/or silicon, to form a first homogeneous mixture, mixing at least one secondary material, e.g., NaCl and/or KCl, with the first homogeneous mixture to produce a second mixture, and pressing the second mixture into a fuel pellet.

The particulate fuel material can include one or more different species of materials that will react with a reactant fluid to form hydrogen. Suitable fuel materials include materials that contain hydrogen so that hydrogen may be derived from both a reactant fluid and the fuel material itself. Suitable particulate fuel materials can include mixtures, alloys, compounds or chemical hydrides that include or contain sodium, potassium, magnesium, calcium, lithium, silicon, aluminum, iron, nickel, cobalt, zinc, gallium, boron, and manganese. Further examples include silicon powders, iron, magnesium, calcium, blends of iron, magnesium, silicon and/or calcium; magnesium hydrides; calcium hydrides; borohydride compounds; aluminum powders, and the like.

The first additive can include one or more materials that enhance the production of hydrogen gas during use of the pellet and/or impart a beneficial property to the fuel pellet. For example, the first additive can include catalytic materials that facilitate a hydrolysis or alcoholysis reaction involving the particulate fuel material and a reactant fluid. Suitable additives include materials such as silicon (which may participate in the hydrogen generation reaction), iron, nickel, cobalt, copper, a corrosion-facilitating agent, or combinations thereof.

As used herein, a "corrosion-facilitating agent" refers to a material whose presence enhances or facilitates the galvanic corrosion of magnesium in aqueous solution, with an end product of the corrosion being hydrogen gas. This material facilitates the corrosion reaction but generally remains unchanged by it or may react with the aqueous solution.

In some embodiments, the first additive includes one or more materials that render a final fuel pellet less flammable and/or a spent pellet less corrosive and/or more easily disposable in an environmentally-friendly manner. For example, the first additive may include a fire retardant material and/or a material that reacts with by-products from the main hydrogen-generation reaction in order to render waste material less toxic, less corrosive, and generally safer to handle. In another example, the first additive may include a material that releases carbon dioxide or other non-flammable asphyxiant when heated (e.g., calcium carbonate). The carbon dioxide or other non-flammable asphyxiant released would act to suppress a combustion of the fuel pellet by displacing or reducing the amount of oxygen in or near the pellet.

In some embodiments, the first additive includes a wax or lubricant. Including lubricant can assist in the manufacture of the pellet by, for example, allowing the fuel material to flow more freely into a mold for pressing into pellets and by making it easier to remove pressed pellets from the mold following compaction. A lubricant additive may also enable pressing at lower compaction pressures by enabling the mixture to compact more effectively. Including lubricants may also increase the strength of the resulting pellet. Including a lubricant can also cause the resulting pellet to be initially very reactive with a reactant fluid and may also make the pellet hydrophilic. In some embodiments, as the hydrogen reaction proceeds and the pellet is spent, the lubricant causes the spent pellet material to become hydrophobic.

The secondary material can include one or more materials that enhance the production of hydrogen gas. The secondary material, for example, may include one or more different kinds of salt (e.g., KCl or NaCl). The NaCl was added to act as a pore-forming agent in the final pellet and the KCl was added as a fire retardant material. Adding the NaCl in the initial mixing step would result in salt particles that are too small to be useful as pore-forming agents.

The secondary material may also include one or more materials that render a final fuel pellet less flammable and/or a spent pellet more easily disposed of in an environmentally-friendly manner. For example, the secondary material may include a fire retardant material and/or a material that reacts with by-products from the main hydrogen-generation reaction in order to render waste material less toxic, less corrosive, and generally safer to handle. For example, the secondary material may include a material that releases carbon dioxide or other non-flammable asphyxiant when heated (e.g., calcium carbonate). The carbon dioxide or other non-flammable asphyxiant released would act to suppress combustion of the pellet by displacing or reducing the amount of oxygen in or near the pellet.

Mixing the particulate fuel material and at least one first additive to form a first homogeneous mixture can include milling the fuel material and first additive to a desired average or median particle size and/or simply mixing the particulate fuel material and at least one first additive in order to obtain a desired homogeneity in the mixture. More preferably, the particulate fuel material is mixed and/or milled with the first additive to form micro galvanic cells on the particles of fuel materials, as discussed above. In some embodiments of the invention, one, more than one, or all of the different components of the fuel material and/or first additive are first milled separately and then mixed or otherwise blended together to form the first homogeneous mixture. In other embodiments, one, more than one, or all of the different components of the fuel material and first additive are milled together and, during the milling process, mixed or blended to form the first homogeneous mixture.

In general, the repeatability and uniformity of the hydrogen generation reaction using the fuel pellets of the present invention is a function of the uniformity of first homogeneous mixture, e.g., of the hybrid iron/silicon coated magnesium particles, as discussed above. Fuel material particle size, for example, can affect the speed of a hydrogen-generating reaction. Also, in some systems the hydrogen generation reaction relies on simultaneous or symbiotic integration of multiple chemical reactions.

The first homogeneous mixture is then mixed or blended with the secondary material to produce the second mixture. In some embodiments, this mixing is continued until the second mixture includes the desired homogeneity and then ceased in order to prevent or reduce any undesired reduction in particle size in the components of the secondary material and/or the first homogeneous mixture.

The second mixture is then compressed so that the constituent particles are bound to one another to form a compact or fuel pellet. Some benefits of pressing the aggregate into a solid pellet is that it prevents the particles of second material from separating, settling or otherwise dissociating during handling, transportation or storage. Once formed into a compact, the particles within the pellet become "locked" in place and are not free to move, so the homogeneity of the mixture is maintained.

Binding the particles of the second mixture to one another also affects the way in which the compact reacts with a reactant fluid. Pressing too hard can cause the fuel pellet to behave more like a solid, limiting its reactivity with a reactant fluid. Even with the inclusion of secondary materials, over-compressing the material may reduce the resulting pellet's reactivity. However, pressing the powder too loosely will result in a fragile pellet that does not have robust handling characteristics. In some embodiments of the invention, the second mixture is pressed until it has a density of between approximately 1.85 and 1.95 grams per cubic centimeter. Depending upon the constituency or composition of the second mixture, pressing the second mixture into such a density may require a variable amount of pressure. In some embodiments, the second mixture is pressed to approximately 200-250 megapascals of compression pressure or to about 220 megapascals of compression pressure.

Compression is desirable from a material handling perspective. It has been found that compressing the homogeneous composite can have beneficial secondary effects such as reducing the flammability of the material. However, compression should be balanced against reducing reactivity of the fuel pellets due to compactness.

Apart from affecting the manner of decomposition or secondary attributes the compression of the second mixture into a pellet can create a defined shape. Creating a defined shape means that aggregate material can be formed into a dimensioned solid form, with optional protruding or intruding features, such as divot 112 on fuel pellet 110. The shape of the pellet can be made to conform to a desired packaging format so that the hydrogen generation material can be inserted into the package and maintain good volume efficiency. The formation of features on the fuel pellet (either intrusions or protrusions) allows pellets to be oriented within the packaging by allowing the fuel pellets to conform to an irregular shaped cavity that may be desired for a particular hydrogen generation reaction system. In some embodiments of the invention, the pellet is also formed in conjunction with structural members (e.g., a mesh, a formed part, or a tubular part). Forming the solid pellet with a structural member may further improve the handling of the fuel pellet.

For manufacturing purposes, it is advantageous to work with shaped solid pellets that can be inserted into packaging using a variety of methods such as pick and place robotic systems, vibration tables, etc. A major benefit of using the pelletized fuel of the present invention is that it reduces the danger of fire associated with handling the otherwise pyrophoric powder fuel materials so that they can be processed in an oxygen rich environment (e.g., ambient air).

Fuel pellets made in Example 1, supra., are pellets make in accordance to this two-step method of making fuel pellets.

EXAMPLE 2

Compositional Affects on Flammability

Figure 15:
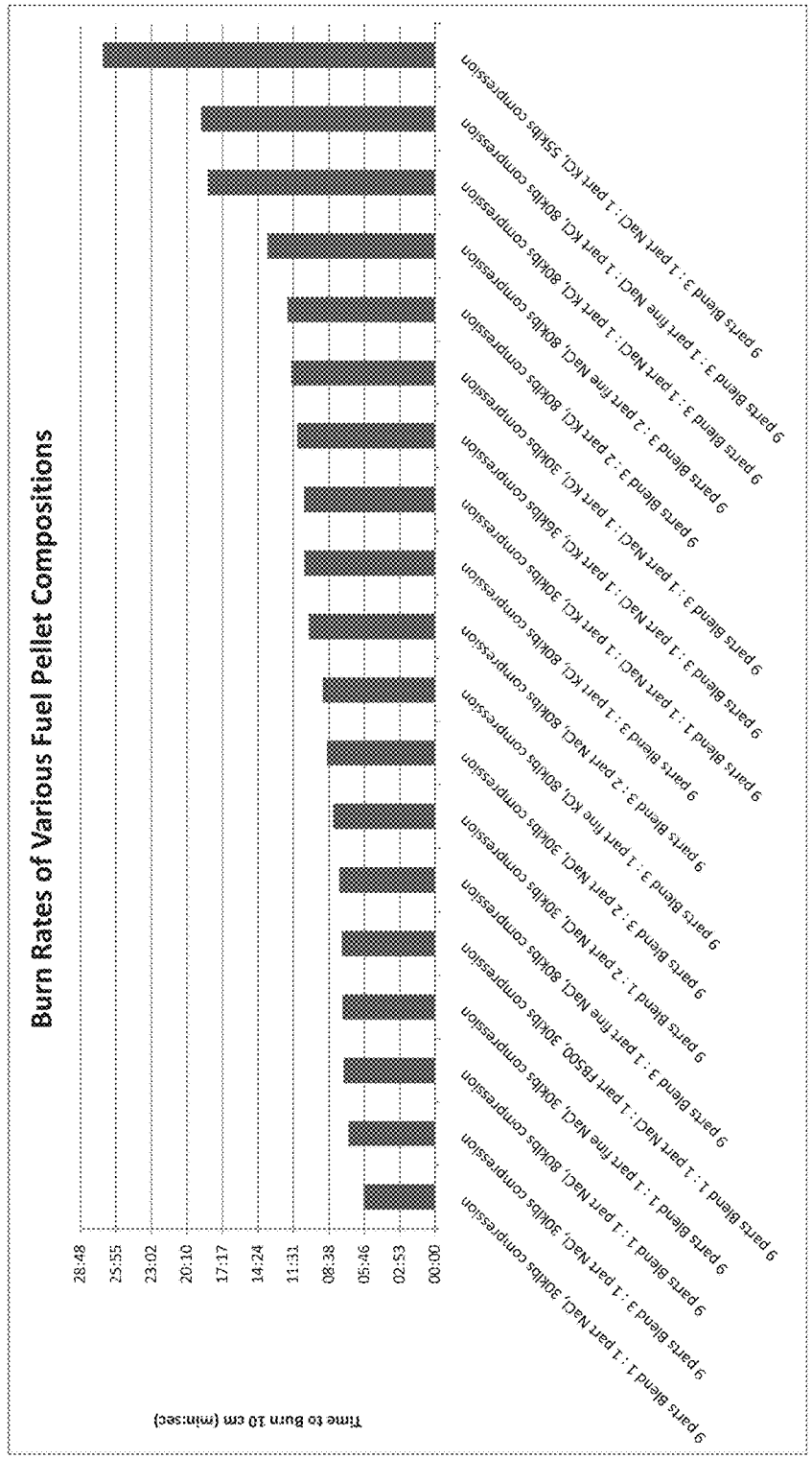
FIG. 15 is a bar graph showing the burn rates of various fuel pellet compositions.

FIG. 15 illustrates a bar graph comparing burn rates of some embodiments of the invention. Fuel pellets of the invention were created using various compositions as well as varying amounts of pressure during the pressing process, as indicated along the X-axis. For example, the first composition (furthest to the left on the X-axis) contained 9 parts of a first homogeneous mixture to 1 part secondary material (sodium chloride) and was press formed using a compressive force of thirty thousand pounds. The term "FB500" refers to FIREBRAKE 500, a commercial chemical composition used as a fire retardant material available from U.S. Borax, Inc. of Greenwood Village, Colo. "Blend 1," "Blend 2," and "Blend 3" refers to comparable fuel material blends, using magnesium powder. More specifically, Blend 1 comprises magnesium particles in the range of about 175 to about 300 microns, and Blend 2 comprises magnesium particles in the range of about 175 to about 400 microns. Blends 1 and 2 do not contain silicon or iron. Blend 3 contains 100 parts of magnesium, 15 parts of silicon and 25 parts of iron. On average, the particle size of the secondary material was approximately 500 microns. The "fine salt" indicates use of the secondary material after it had been further crushed and had an average particle size on the order of about 10-50 microns.

The Y-axis shows how long it took for a 10 cubic centimeter portion of the resulting pellet to burn. Generally, the time it takes for a pellet to burn is indicative of the pellet's flammability, with pellets that take longer to burn generally being less flammable than pellets that burn more quickly.

Figure 16:
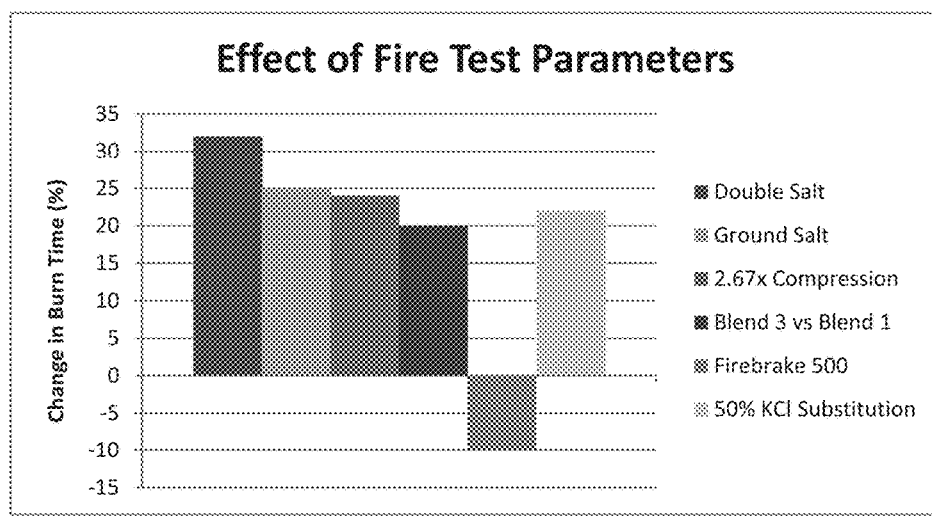
FIG. 16 is a bar graph showing the effect of the different fire retardants.

FIG. 16 illustrates a bar graph comparing the difference in time that was needed to burn a 1 cubic centimeter portion of a pellet composition. From left to right, the bars shown in the graph indicate the difference in time needed to burn a pellet that i) included double the quantity of salt relative to the quantify of fuel material used in the baseline pellet (i.e., a magnesium to salt ratio of about 9:2 instead of about 9:1), ii) included a finely ground salt having an average particle size on the order of 10 to 50 microns, iii) was created by pressing the constituent materials with 2.67 times more compression relative to the other samples (i.e., 80,000 pounds force compared to 30,000 pounds force), iv) included FIREBRAKE 500, and v) included a composition where the total quantity of salt included in the mixture comprised half NaCl salt and half KCl salt (i.e., a ratio of magnesium to sodium chloride to potassium chloride of about 9:1:1).

As shown in the comparative data of FIG. 15, including the FIREBRAKE material in the fuel pellet composition increased the burn rate significantly. It is hypothesized that the FIREBRAKE material was releasing moisture as the pellet was heated and that this moisture reacted with the fuel material in the pellet.

EXAMPLE 3

Forming Pellets from Exemplary Chemical Hydride

A sample fuel pellet was formed comprising calcium hydride and optional silicon. Calcium hydride powder and silicon powder were combined in a turbular mixer in a ratio of about 1 part calcium hydride to 0.28 parts silicon (by weight). The calcium hydride powder was fine enough to pass through a 2 millimeter sieve. The silicon powder had a mesh size of about 325 and a purity of at least 98%. The mixing time was about 30 minutes, the mixing batch size was about 366 grams, and the mixing was conducted at about room temperature. After mixing was complete, the resulting second mixture was pressed into pellets weighing about 2.25 grams using about 35,000 pounds force of pressure. The pellets had a diameter of about 6.6 millimeters.

In another embodiment of the present invention, solid precursor 18 can be suspended in a suspension agent and formed into slurries or gels and the like. The suspension agent can act as a protective coating against fuel reaction with water vapor. This would be helpful to fuels that are very reactive with water vapor, such as calcium hydride. Advantageously, such fuel slurry or gel can react with liquid precursor 16, when the liquid precursor is dosed by dose pump 22 onto the slurry or gel and when the fuel slurry or gel is pumped toward liquid precursor 16. Suitable suspension agents include non-hygroscopic agents, i.e., agents that do not absorb water, such as mineral oils and dispersants. Suitable dispersants include, but are not limited to, a sodium salt of an acrylic polymer commercially available as Acumer™ 9000 and 9141 from Dow Chemical or Rohm & Haas. Additionally, solid precursor 18 can be mixed with a non-hygroscopic suspension agent and then pressed into fuel pellets 110, as discussed above.

In one example, a solid precursor such as calcium hydride is mixed with mineral oil to various consistencies from a paste (1 part calcium hydride to 0.275 part mineral oil) to a flowable viscous gel/slurry (1 part calcium hydride to 1 part mineral oil). The mineral oil minimizes the reaction between calcium hydride and atmospheric moisture. Additionally, slurries or gels can be milled with a finer consistency. Addition of one or more dispersants may help improve the stability of less viscous slurries. Slurry solid precursor 18 and liquid reactor 16 may react in any reactor, and preferably are reacted in reactors that allow the two precursors to mix intimately and completely. Exemplary reactors include those disclosed in published U.S. patent application nos. 2008/0286621 and 2010/0104481. These references are incorporated herein in their entireties.

Other suitable hydrogen producing fuels include, but are not limited to, chemical hydrides such as lithium hydride, lithium borohydride, sodium hydride, sodium borohydride, potassium hydride, potassium borohydride, lithium aluminum hydride, combinations, oxides and salts thereof. Other suitable fuels are disclosed in published international patent application WO 2010/051557 and published U.S. patent application 2011/0099904. These references are incorporated herein in their entireties.

Exemplary chemical hydrides, e.g., calcium hydride and sodium borohydride, react with water to form hydrogen. These reactions are as follows:

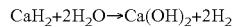

$$CaH_2 + 2H_2O \rightarrow Ca(OH)_2 + 2H_2$$

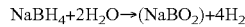

$$NaBH_4 + 2H_2O \rightarrow (NaBO_2) + 4H_2$$

Alternatively, hydrogen can be stored in hydrogen sorbent metal hydride, such as lanthanum nickel ($LaNi_5$). Suitable hydrogen sorbent metal hydrides and cartridges for storing same are disclosed in U.S. Pat. No. 7,563,305 and in published U.S. patent application 2009/0060833. These references are incorporated herein in their entireties. Hydrogen can also be stored in compressed or liquefied form.

Figure 17:
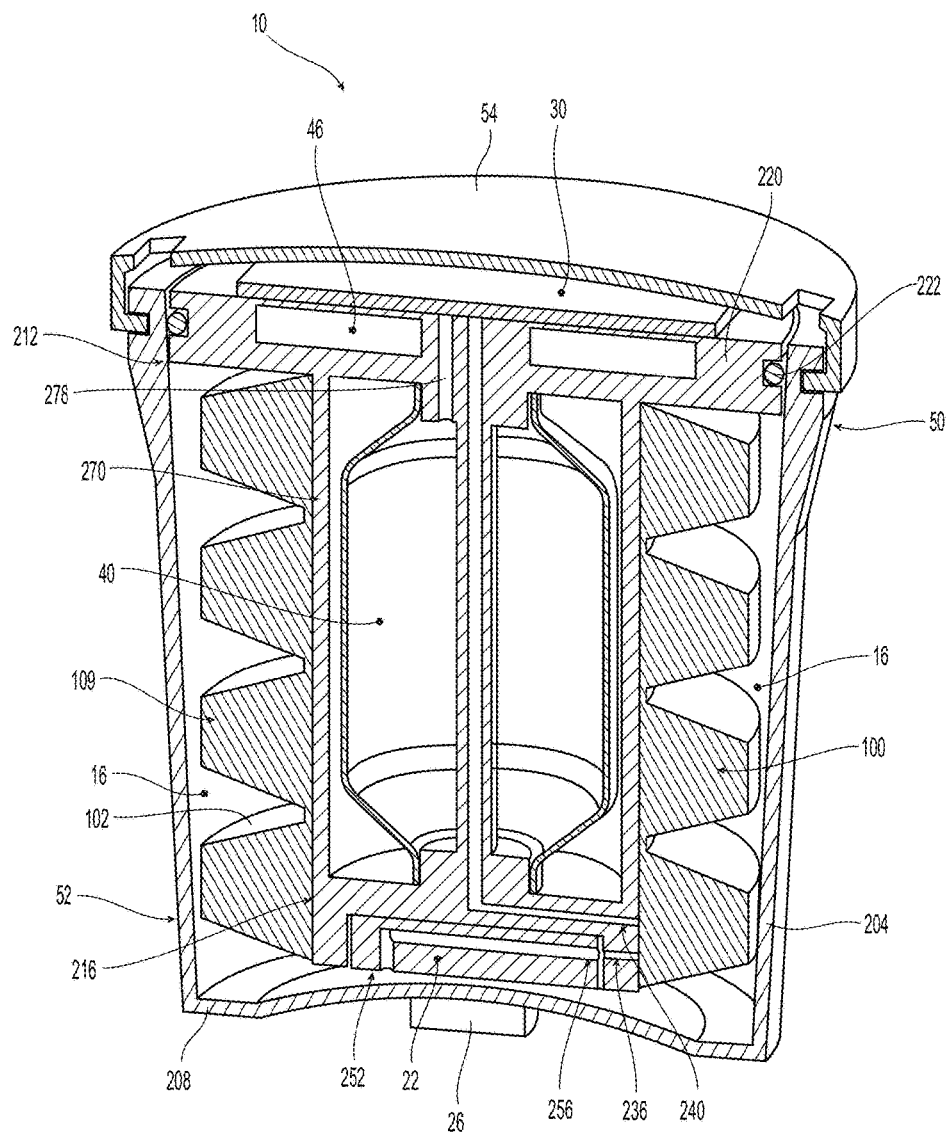
FIG. 17 is a cross-sectional view of the fuel cell system shown in FIG. 3 and illustrated schematically in FIGS. 1 and/or 2.

Referring now to FIG. 17, which is a cross-sectional view of the fuel cell system 10 shown in FIG. 3 and represented schematically in FIG. 1 and/or FIG. 2. Such fuel cell system is fully disclosed in parent provisional application nos. 61/442,098 and 61/441,996. As stated above, housing member 50 of fuel cell system 10 has base 52 and lid 54. Base 52 further comprises upstanding side wall 204 and bottom wall 208. Lid 54 provides a cover for base 52. Base 52 has opening 212 to receive liquid precursor, and within housing 50 is core 216. Core 216 has upper disk 220, which can be sealed to base 52 of housing 50 via seal or O-ring 222, and buffer chamber 270, which carries gas buffer 40. Since the fuel cell and the electronics of fuel cell system 10 are carried on top of disk 220 of core 216, it is advantageous to seal upper disk 220 to base 52 to retain liquids and gases between core 216 and base 52. Lid 54 also has openings or vents as best shown in FIGS. 3 and 17 to allow air to enter to reach the cathode side of fuel cell 30

To insert fuel cartridge 100, lid 54 is removed from housing 50, and core 216 (including disk 220 and buffer chamber 270) is removed in its entirety leaving a hollow chamber inside cylindrical base 52. Liquid precursor 16, e.g., water, brine solution, an alcohol or other liquid reactants, is poured into cylindrical base 52 through opening 212 to a certain marking to ensure that a sufficient amount of liquid reactant has been received. A fuel cartridge 100, e.g., the fuel cartridge illustrated in FIG. 4 or 6 or any cartridge 100 discussed above, is wrapped around buffer chamber 270 of core 216, as shown. Cartridges 100 discussed above are flexible and can be inserted into housing 50. It is noted that as illustrated in FIG. 17, cup layer 102 is oriented outward away from core 216, the opposite can also be true, i.e., cup layer 102 faces core 216. Once fuel cartridge 100 is secured to core 216, core 216 and fuel cartridge 100 are re-inserted into cylindrical base 52, which is partially filled with liquid precursor 16, and the system is resealed.

To start the production of hydrogen, starter 26 is located at the bottom of fuel cell system 10 is activated. Starter 26 can be a blister pump, similar to those found on athletic shoes, which the user may push. Starter 26 can also be a pushbutton or a turn button which applies an initial pressure to liquid precursor 16 within base 52. Suitable starting devices, such as starter 26, are disclosed in U.S. Pat. No. 7,481,858, published international patent application WO 2010/051557 and published U.S. patent application 2011/0099904. These references are incorporated herein in their entireties.

Activation of starter 26 would initially dose an amount of liquid precursor 16 through dose pump 22 into fuel cartridge 100 and more specifically into liquid flow channel 107 of cartridge 100, discussed in detail above. This will start the production of hydrogen. Produced hydrogen travels through fuel cartridge, as discussed above, and exits fuel cartridge 100 and into gas flow passage 240 within core 216. Gas flow passage 240 takes the produced hydrogen to fuel cell 30 located on top of disk 220 of core 216. Excess hydrogen is directed to gas buffer 40 through gas buffer passage 278. Buffer chamber 270 within core 216 may be filled with a gas, such as air or an inert gas, outside of gas buffer 40 to partially resist the expansion of an inflatable or expandable gas buffer 40, or may be a partial vacuum to allow easier expansion of gas buffer 40. In a preferred embodiment, buffer chamber 270 is vented to atmosphere, so that gas buffer 40 can expand or contract without hindrance. An electronic vent, as discussed above, e.g., auxiliary circuit or load 46 is conveniently located within disk 220 of core 216.

Fuel cell system 10 can operated in any orientation. Dose pump 22 operates between the pressure in the reaction chambers or cups 109 and the pressure of liquid precursor 16 and their equalization, and can operate in any orientation. Cartridge 100 receives liquid precursor 16 from dose pump 22 and can also be operated in any orientation. Hydrogen gas can be transported also in any orientation and gas buffer 40 and fuel cell 30, as well as all the electronics, are also orientation independent.

Dose pump 22 in this embodiment is located near the bottom of core 216. Dose pump 22 has inlet port 252 in fluid communication with liquid precursor 16, which is stored between fuel cartridge 100 and cylindrical base 52 of housing 50, and outlet port 256 in fluid communication with liquid flow channel 107 within fuel cartridge 100. Suitable dosing pumps are discussed in details below and also discussed in parent application Ser. No. 61/442,130. As illustrated in FIGS. 1 and 2, dosing pump 22 has dose storage 21, which preferably is resilient, and upstream check valve $23_1$ and down stream check valve $23_2$. Dosing pump 22 transports liquid precursor 16 to solid precursor 18 or fuel pellets 110.

Dose pump 22 uses a liquid feedback system to achieve stable and controlled operation. The pressure feedback chamber is configured to contain at least part of the liquid. The apparatus also includes a membrane, such as membrane 24 discussed below. The membrane is configured to separate the pressure feedback chamber from the produced hydrogen.

The membrane is configured to transfer pressure between the pressure feedback chamber and the produced hydrogen.

Inlet check valve $23_1$ and outlet check valve $23_2$ allow the liquid precursor to pass in one direction and prevent the flow of liquid in the reverse direction. Inlet check valve $23_1$ is configured to allow liquid to pass from the liquid reservoir (between base 52 of housing 50 and core 216) that holds liquid precursor 16 into pump 22. In this embodiment, this liquid reservoir is pressurized by the reaction between liquid precursor 16 and fuel pellets 110, discussed below. Outlet check valve $23_2$ is configured to allow liquid precursor 16 to pass from pump 22 to the reaction chambers, which are cups 109 in cup layer 102 of cartridge 100. In both cases, liquid will be driven through the valves when there is sufficient pressure differential between the liquid on either side of the valve to overcome the cracking pressure of the valve. The check valve configuration allows liquid to flow from the liquid precursor reservoir, which is also a pressure feedback chamber, through the pump and eventually into the reaction chamber(s).

Dose volume 21, which is a variable volume liquid accumulator that includes a resilient surface configured with a spring or elastic member that increases the force exerted on the liquid precursor in dose volume in proportion to the amount of the liquid precursor contained in dose volume 21. This variable accumulator feature can allow pump 22 to operate robustly over a range of pressures. This means that as the pressure in the liquid precursor reservoir or the pressure feedback chamber increases the volume of liquid that will enter the accumulator will increase. At some pre-defined maximum pressure, the spring or resilient member biasing dose volume 21 will be fully displaced and no increase in the accumulated volume will take place, even if the overall pressure increases further.

The spring constant of the spring within the pump, or of the resilient member forming dosing volume 21 within the pump, can be adjusted to attain a desired pressure range of the generated fuel. The spring element can be selected so that the spring is fully compressed at the target maximum operating pressure for the system. By selecting the spring in this way, if there is an overpressure event the pump will stall due to the spring remaining in the fully compressed state, and will not dose any water until the system pressure is lower than target maximum pressure. This can help to prevent a runaway condition where the system may continue dosing water during high pressure events. The relationship between the force the spring exerts when fully compressed, the maximum operating pressure of the system, and the area of the resilient surface of dosing volume 21 or the accumulator, can be approximately expressed as follows:

Force of the spring at solid height=Maximum operating pressure·Piston area of accumulator The operating cycle of one example embodiment of the present invention can be described as follows. A small quantity of liquid is introduced into the reaction chamber or cup 109 for example by actuating starter 26, thus contacting the fuel and generating hydrogen. As the hydrogen is generated, the gas pressure in the reaction chamber or cup 109 increases, causing a force to be exerted on a membrane separator, which in the embodiment of FIG. 17 is cup layer 102 of fuel cartridge 100, and therefore increasing the pressure inside the liquid precursor reservoir between base 52 and cup layer 102, which is the pressure feedback chamber in this embodiment. The liquid precursor reservoir and the reaction chamber/cup 109 preferably, rapidly achieve the same internal pressure. Due to the pressure in the liquid precursor reservoir, which is the pressure feedback chamber, liquid precursor will be pushed through inlet check valve $23_1$ and into dosing volume 21 until its pressure is also equilibrated with the pressures in the two chambers. At this point the system has generated hydrogen and has 'primed' the dosing pump. If no hydrogen is drawn from the system, it should in principle maintain both the hydrogen pressure and also a full charge on the water pump. Since pressure is equal in all components of the system no liquid water will flow, and so no further dosing of water or hydrogen generation will occur.

As hydrogen is removed from the system, the pressure in the reaction chamber or cup(s) 109 would decrease. In turn, the force on the membrane separator or cup layer 102 is decreased and once again the pressure within the liquid precursor reservoir, which is the pressure feedback chamber, will follow the pressure within the reaction chamber or cup(s) 109. At this point the liquid contained within dosing volume 21 inside pump 22 will be at a higher pressure than the rest of the system, so liquid within dosing volume 21 will be forced through outlet check valve $23_2$ into the reaction chamber or cup(s) 109 until the pressure in pump 22 (created from the force of the displaced spring element) equalizes with the pressure in the rest of the system. The liquid which was forced into the reaction chamber is then able to react to produce hydrogen, which will begin to increase the pressure in the system causing the cycle to repeat.

The system operates by repeating this cycle of charging and discharging the liquid accumulator within the pump. At high reaction chamber pressure the pump is 'charged' and then the system will equilibrate. As the pressure in the reaction chamber falls the pump is 'discharged'. When the pressure in the reaction chamber falls to a certain level, the system will seek to return to the high pressure state whenever possible.

In embodiments of pump 22 of the present invention, the liquid is dosed in batches which have an upper limit (volume) defined by the volume of dosing volume 21. If the pressure increases within the reaction chamber, dosing volume 21 in pump 22 will become fully charged but not overcharged, and by the nature of the operation that charge of liquid will not be dosed into the reaction chamber until the pressure in the reaction chamber falls well below the maximum operating pressure as defined by the spring force and accumulator volume of the pump, discussed above. Moreover, if there is a leak in the system that begins to cause a rapid loss of hydrogen to the outside then at most one accumulator volume will be dosed into the reaction chamber once the leak has occurred. Once the leak has occurred pressure will not build up in the system, and so there will be no energy to force the liquid to re-prime the dosing pump.

Figure 18:
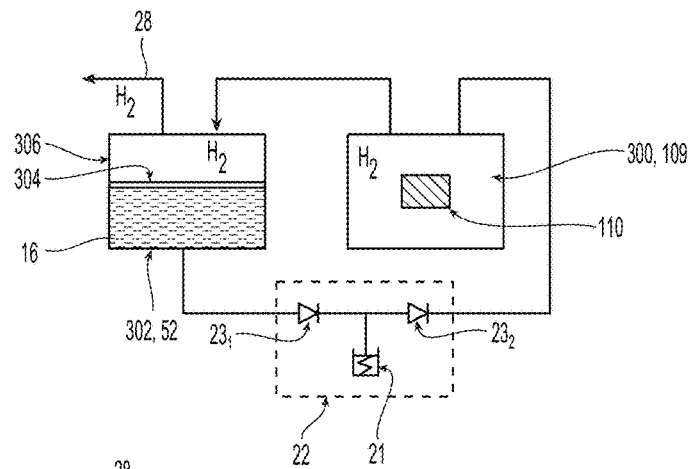
FIGS. 18-20 are schematic drawings of inventive dose pumps for use with the inventive fuel cell system.

A schematic of an embodiment of hydrogen generation system 12 of fuel cell system 10 is shown in FIG. 18. Hydrogen generation system 12 includes a reaction chamber 300, which in the embodiment shown in FIG. 17 is cup(s) 109. Reaction chamber 300 is configured to contain a fuel-generating material or fuel pellet 110, which in the embodiment of FIG. 17 is contained in cup 109 of fuel cartridge 100. The fuel-generating material generates a gaseous fuel when contacted with a liquid. Hydrogen generation system 12 also includes a pressure feedback chamber 302, which in FIGS. 1 and 2 is the reservoir holding liquid precursor 16 and in FIG. 17 is the reservoir formed between cylindrical base 52 and cup layer 102 of fuel cartridge 100. The pressure feedback chamber 302 is configured to contain at least some of liquid precursor 16. The apparatus also includes a membrane 304. Membrane 304 is configured to separate the pressure feedback chamber 302 and the hydrogen fuel generated by contact between liquid precursor 16 and the fuel-generating material 110. The membrane 304 is configured to transfer pressure between the pressure feedback chamber 302, which contains liquid precursor 16 and the hydrogen pressure in reaction chamber 300. The apparatus 100 also includes a liquid-dosing pump 22 configured to contain some liquid precursor within dosing volume 21 to be pumped to reaction chamber 200. Pump 22 is configured to pump at least some of the liquid precursor to contact the fuel-generating material 110 in reaction chamber 300.

In some embodiments, pump 22 can control the amount of fuel generated by the fuel-generating material such that the pressure of the fuel in the reaction chamber or the pressure of the fuel provided by the apparatus is maintained within any two pressures. In one example, the amount of fuel generated by the fuel-generating material such that the pressure of the fuel in the reaction chamber or the pressure of the fuel provided by the apparatus is maintained within about 0.01 psi to about 100 psi. In other examples, the pressure can be controlled to be within about 0.1 psi to about 30 psi, or within about 0.5 psi to about 25 psi, or within about 1 psi to about 15 psi. In other embodiments, the pressure can be controlled to be within about 0.5 psi to about 20 psi, or within about 1 psi to about 15 psi, or within about 2.5 psi to about 9 psi.

As shown in FIG. 18, hydrogen gas generated in reaction chamber 300 is transported to a gas-containing chamber 306. Membrane separator 304 separates the hydrogen gas from liquid precursor 16 and allows the equalization of pressure between reaction chamber 300, gas containing chamber 306 and the liquid precursor 16 stored the pressure feedback chamber 302. This means that as the fuel pressure in the reaction chamber 300 varies, the force exerted on the membrane separator 304 changes and thus the pressure of the liquid 16 in the pressure feedback chamber 302 will follow the pressure in the reaction chamber 300. Note, though, that due to the membrane separator 304 no hydrogen is allowed to directly enter the pressure feedback chamber (e.g. liquid reservoir) 302.

Membrane separator 304 may be a separate component of hydrogen generating system 12, or in the embodiment where a fuel cartridge is used to contain the fuel-generating material such as the embodiment shown in FIG. 17, one or more cartridge walls such as cup layer 102 may function as the membrane separator to prevent the ingress of hydrogen into the water reservoir. Some embodiments of the present invention can include a flexible cartridge wall and a discrete membrane separator.

The membrane separator of the present invention can include any suitable membrane material. The membrane preferably has minimal permeability toward the particular fuel used. In some embodiments, the membrane can include polyurethane. In some embodiments, the membrane can include any polymeric material, for example, any plastic. In some embodiments, the membrane can include a natural or synthetic rubber or other elastomers.

Figure 19:
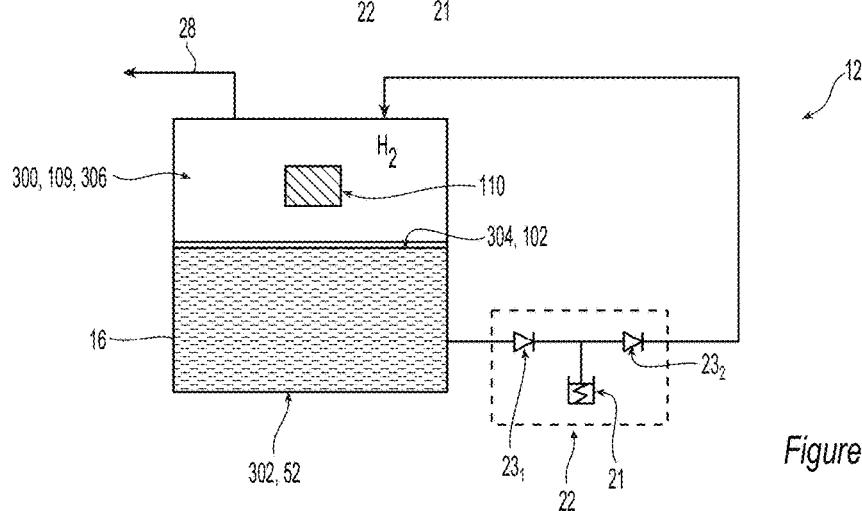

FIG. 19 shows another embodiment of hydrogen generation system 12. The embodiment shown in FIG. 19 is substantially similar to that shown in FIG. 18, except that the gas containing chamber 306 is eliminated and reaction chamber 300 now directly opposes membrane 304.

Figure 20:
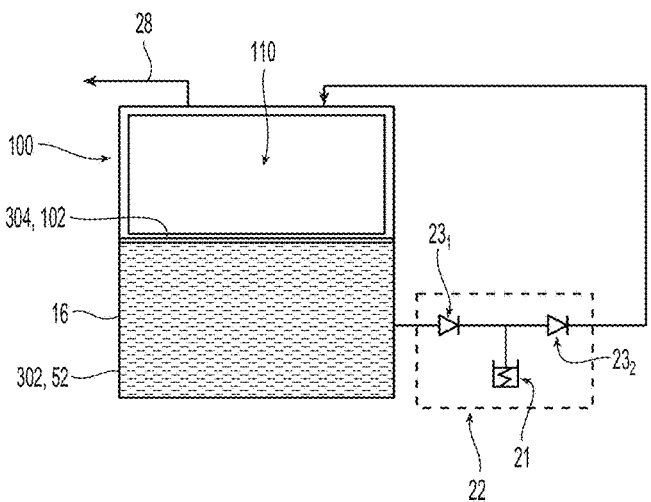

FIG. 20 shows another embodiment of hydrogen generation system 12. The embodiment shown in FIG. 20 is substantially similar to that shown in FIG. 19, except that fuel cartridge 100 provides the reaction chambers 300 for example in the form of cups 109. Additionally, one or more walls of fuel cartridge 100, such as cup layer 102 can serve as membrane 304.

The embodiment of FIG. 20 is used in fuel cell system 10 shown in FIG. 17. Referring to the left hand side of FIG. 17, cups 109 each containing a fuel pellet 110 act as reaction chambers 300. Cup layer 102 which forms the outside surface of fuel cartridge 100 acts as pressure equalizing membrane 304. Liquid precursor 16 is contained in a reservoir defined between base 52 of housing 50 and cup layer 102. As discussed above, fuel pellets 110 preferably react one-by-one with liquid precursor 16 as the liquid is pumped by dose valve 22. As each fuel pellet 110 reacts producing hydrogen and expands, cup layer 102 pushes on liquid precursor 16 and pressurizes the liquid. This pressurization cracks inlet check valve $23_1$ (not shown in FIG. 17) located proximate to inlet port 252 and a dose of liquid precursor 16 is stored in dosing volume 21. Produced hydrogen is transported through hydrogen passage 240 to fuel cell 30 and/or gas buffer 40. As produced hydrogen is consumed by fuel cell 30, the pressure in reacting cup 109 decreases. This pressure decrease cracks outlet check valve $23_2$ located proximate to outlet port 256 and the dose of liquid precursor 16 stored in dosing volume 21 is transported to the fuel cartridge and to the reacting cup 109 or to the next-in-line cup 109 to produce additional hydrogen.

Other suitable dose pumps are disclosed and claimed in published US patent application US 2010/0104481, which is incorporated herein by reference in its entirety. The US 2010/0104481 publication discloses dose pumps that utilize the pressure from the produced hydrogen to pressure the volume of liquid precursor within the dosing volume and can be used with pressurized and non-pressurized liquid precursors. Dose pumps disclosed in US 2010/0104481 also do not require a pressure equalization mechanism.

As liquid precursor 16 is consumed by the process discussed in the preceding paragraph, fuel pellets 110 expands to replace the lost volume of liquid precursor to maintain the pressure balance to operate pump 22. However, as hydrogen is being consumed by fuel cell 30 mass is removed from the system, and the lost liquid volume may not be fully replaced by the expansion of the fuel pellets creating an under-pressurized liquid 16. On the other hand, residual hydrogen trapped in cups 109 may over-pressurize liquid 16. In another embodiment, a volume compensator 504 is provided preferably proximate to the interface between the fuel pellets and the liquid. Referring to FIG. 21A, volume compensator 504 is shown to be in pressure communication with liquid precursor 16 and fuel cartridge 100 before being used, i.e., on-the-shelf conditions. As the volume of liquid precursor 16 decreases and the volume of fuel cartridge 100 increases as best illustrated in FIG. 21B, the volume of compensator 504 changes to adapt to ensure that the pressures in liquid 16 and in fuel cartridge 100 remain substantially the same. It is noted that in FIG. 21B, the volume of compensator 504 increases, but this volume may also decrease to perform the same pressure equalization function.

The pressure equalization function as described above is performed by membrane 304 or cup layer 102 shown in FIGS. 18-20 and 21A-B. This pressure equalization function is schematically represented by reference number 24, a pressure equalization diaphragm, in FIG. 1.

Preferably volume compensator 504 comprises a resiliently flexible body or gas plenum mounted on or to core 216 such that at least part of the volume compensator 504 is located in the reservoir containing liquid precursor 16, when inflated. Volume compensator 504 is a balloon-like component having an inlet in gas flow communication with gas flow passage 240, so that the volume compensator 504 is in gas flow communication with fuel cartridge 100. Volume compensator 504 thus shares a common pressure with fuel cartridge 100 and liquid precursor 16. When a decrease in the volume of water in the liquid precursor reservoir, however, differs from an increase in volume of the fuel cartridge 228, volume compensator 504 may expand to equalize the pressure, and to prevent the occurrence of a vacuum- or suction effect in the liquid precursor reservoir, which may act to impede or retard flow of liquid precursor 16 through pump 22 into the fuel cartridge 100. In the event that cup layer 102 is too stiff or too slow to equalize pressure, volume compensator can provide additional expansion or contraction to equalize pressure. Due to the above-described pressure feedback configuration, pressures in volume compensator 504 and liquid precursor 16 are substantially equal.

Figure 22:
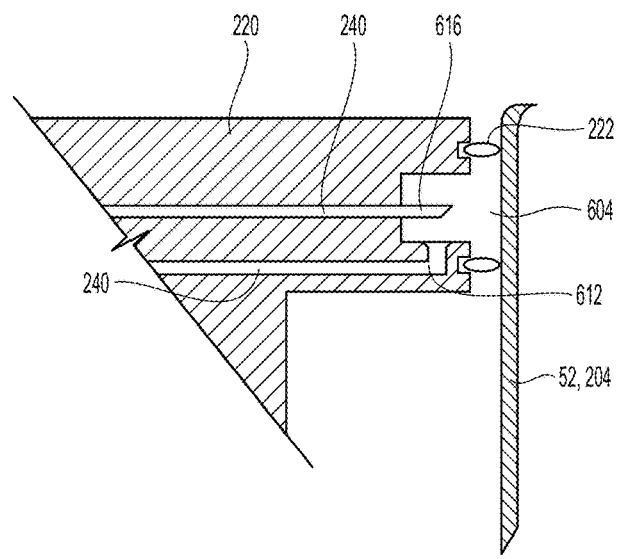
FIG. 22 is a schematic partial cross-sectional view of an inventive fuel cell system showing a water trapping mechanism.

Fuel cell system 10 may further include a water trap in the form of a liquid trapping volume, shown in FIG. 22, to remove water or liquid from the hydrogen gas generated by fuel cartridge 100. Hydrogen gas generated by fuel cartridge 110 may be saturated with water or water vapor depending on the pressure and temperature of water within the fuel cartridge, which may be undesirable to the operation of fuel cell 30. Water droplets may form in the hydrogen gas, which may block or occlude the gas flow passages 240, 278 or other gas flow channels leading to and/or from the anode(s) of fuel cell 30. To this end, liquid trapping or knockout volume 604 separates liquid water from the gas stream, which may still contain water vapor notwithstanding the desiccant and other scavengers in pod 111 in fuel cartridge 100. Gas flow passage 240 leading from the fuel cartridge 100 to fuel cell 30 includes a portion (shown in FIG. 22) that passes through the water trapping volume 604, so that the water trapping volume 604 is provided in-line in the gas flow passage 240.

Water trapping volume 604, as shown, is defined between a radially outer peripheral edge of disk formation 220 of core 216, and cylindrical side wall 204 of cylindrical base member 52. In the present example, water trapping volume 604 comprises an open recess in the radially outer edge of the disk formation 220. It will be appreciated that the water trapping volume 604 is thus defined by two or more separate components of housing 50, and these components are disconnected from one another when housing 50 is disassembled. Water trapping volume 604 is sealed off by a seal arrangement comprising seals 222 bearing against side wall 204 of base 52 and extending peripherally around water trapping volume 604. Other water trapping arrangements may be provided in other embodiments, a water trapping volume, for example, being formed by different components as those described above. It is advantageous, however, to form such water trapping arrangements such that the water trapping volume is necessarily exposed, drained, or opened when housing 50 is disassembled to replace fuel cartridge 100 or to refill.

An inlet 612 on gas passage 240 for hydrogen and water leads into the water trapping volume 604, while an outlet 616 for gas projects into the water trapping volume 604, being positioned more or less centrally in the water trapping volume 604. The outlet 616 is thus positioned within the water trapping volume 604 such that only gas would exit the water trapping volume, regardless of the orientation of the container 104. In operation, water collects in the water trapping volume 604. When housing 50 is, however, disassembled or opened in order to replace fuel cartridge 100 or to recharge the liquid precursor reservoir with water, water trapping volume 604 is opened to discharge any accumulated water from the water trapping volume 604. Water trapping volume 604 may be sized to capture liquid water product produced by a single fuel cartridge 100, in order to optimize available volume within housing 50. In other embodiments, at least one wall of the water trapping volume may be formed by the fuel cartridge 100.

Additionally, as shown in FIG. 22, hydrogen flow passage 240 preferably has one or more pressure drop locations. First, there is at least one bend in passage 240, where inlet 612 terminates and outlet 616 begins Gases generally take a pressure drop around angles and bends, and vapors tends on condense to liquid at pressure drops. Hence, angles and bends can facilitate the condensation of water vapor into water trapping volume 604. Preferably, these angles and bends are greater than about 90 degrees, more preferably greater than about 180 degrees, and such angles and bends may comprises multiple 180 degree bends, i.e., serpentine shape. The expansion from passage 240 to trap volume 604 also provides another pressure drop.

Figure 23:
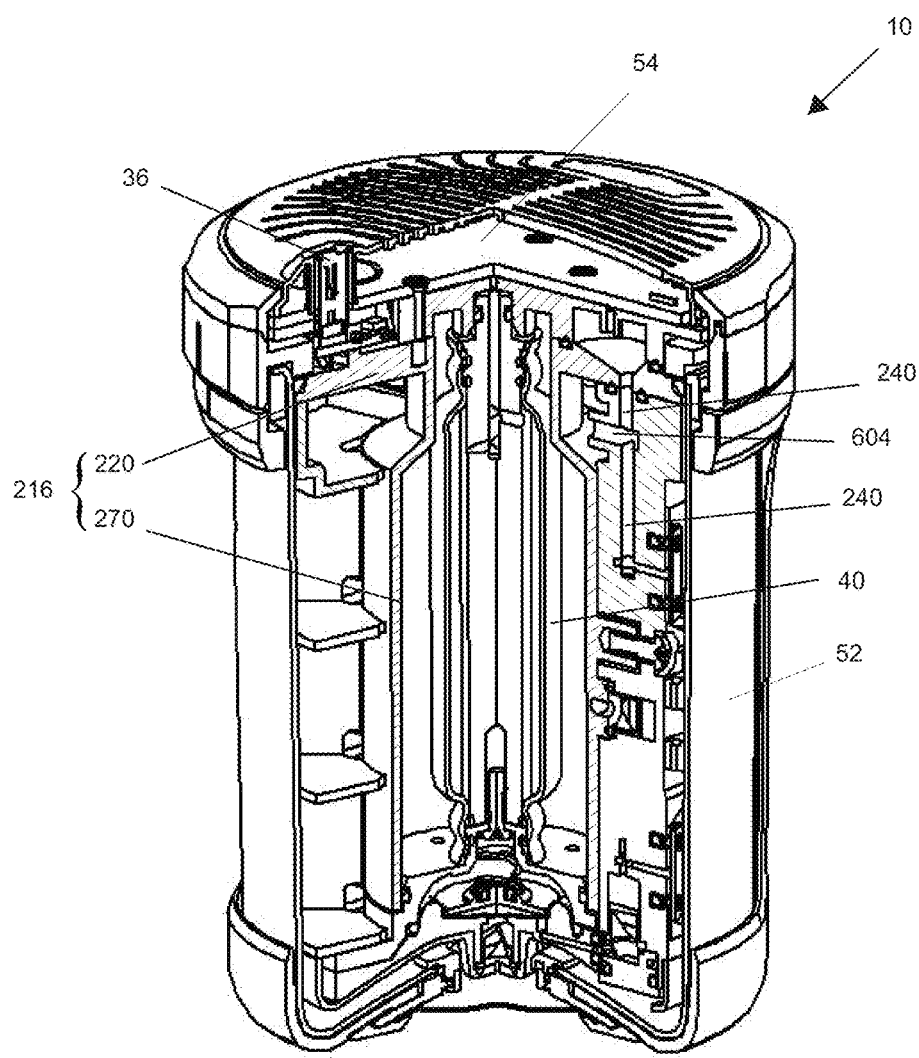
FIG. 23 is a partial cutaway view of a fuel cell system similar to that shown in FIGS. 3 and 17 showing another water trapping mechanism.
Figures 24A, 24B:
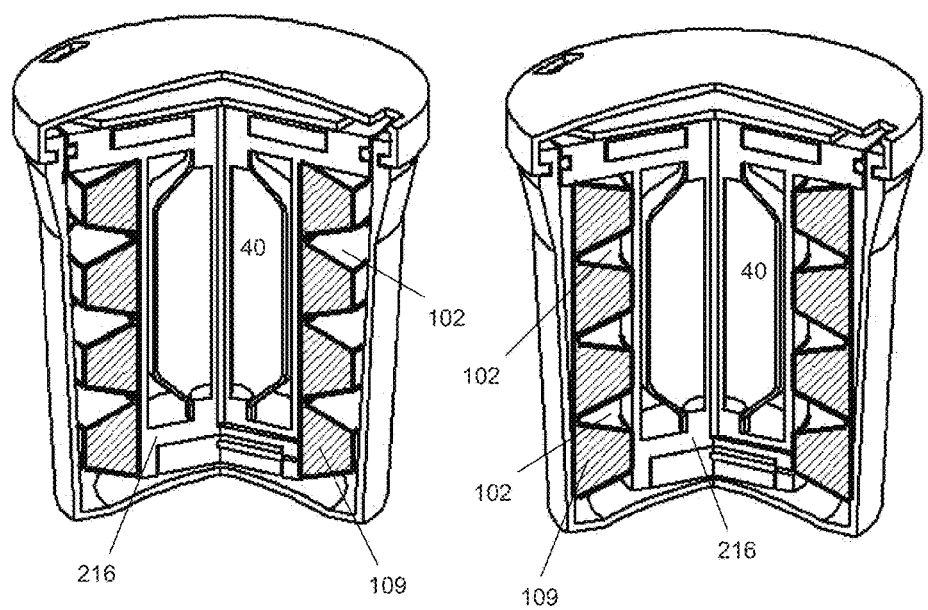
FIGS. 24A and 24B are partial cutaway views of the fuel cell system similar to that shown in FIGS. 3 and 17 showing different orientations of the fuel cartridge when installed in the fuel cell system.

FIG. 23 illustrates another embodiment of water trapping volume 604, which is housed internally within housing 50. FIG. 23 also shows an inflatable or expandable gas buffer 40 in a partially collapsed configuration in contrast to that shown in FIG. 17. FIG. 24A shows fuel cartridge 100 wrapping around core 216 with cup layer 102 facing outward similar to that shown in FIG. 17, and FIG. 24B shows cup layer 102 of fuel cartridge 100 wrapping around core 216. All these configurations are within the scope of the present invention.

Figure 25A:
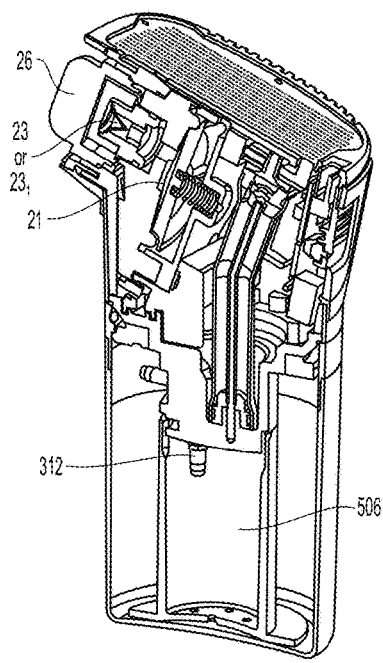
FIGS. 25A-25H are cross-sectional views of another inventive fuel cell system 10.
Figure 25B:
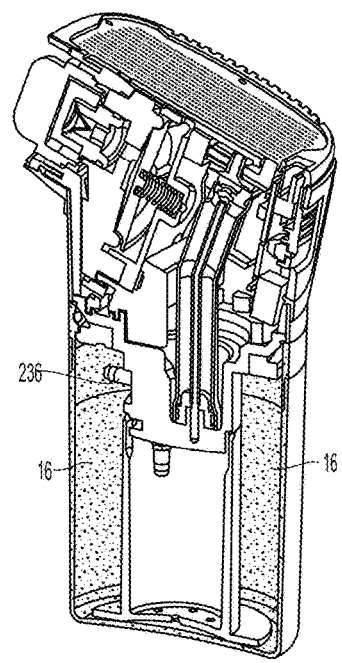

FIGS. 25A-25H illustrate another inventive fuel cell system 10. Differences between this fuel cell system and the one shown above, particularly in reference to FIGS. 3 and 17 are discussed below. Each of these Figures highlights a different subsystem. FIG. 25A shows that starter 26 has been moved to the top left of the device. Starter 26 can be a push button or it can be turned, e.g., ¼, ½, ¾ etc. turn, to prime the system. One of the check valve $23_1$ or $23_2$ of dose pump 22 is advantageously connected to starter 26, so that if starter 26 is removed from the system, the system is rendered inoperable. Additionally, volume compensator 504 (not shown) is positioned within its own compensator chamber 506, and spigot 312 is provided to connect volume compensator to the produced hydrogen. FIG. 25B highlights the reservoir between base 52 and core 216 where liquid precursor 16 and fuel cartridge 100 are inserted into the system. Liquid may enter through a fill port proximate to the check valve connected to starter 26. The second check valve may serve as the fuel port. Liquid may enter when the lid is removed to insert fuel cartridge 100. Port or water inlet passage 236, also shown in FIG. 17, is sized and dimensioned to be connected with liquid flow channel 107 of cartridge 100.

Figure 25C:
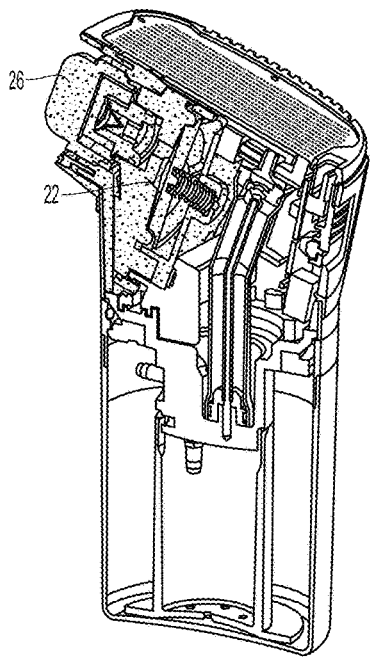
Figure 25D:
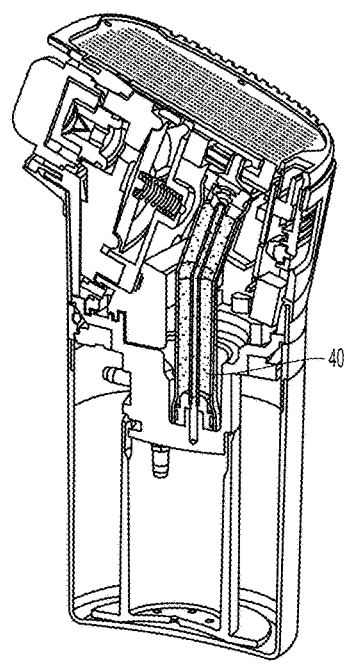
Figure 25E:
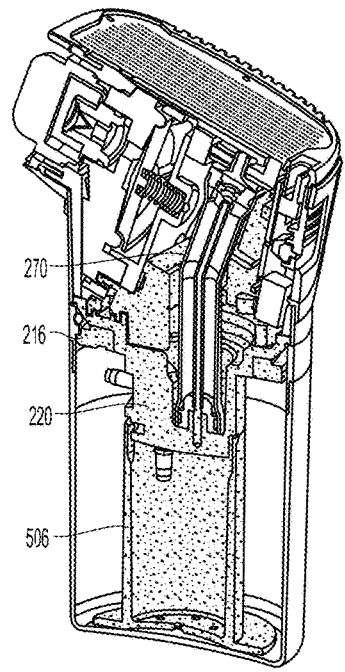
Figure 25F:
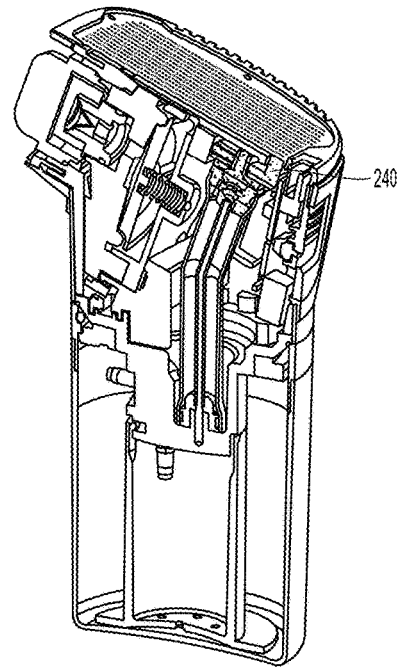
Figure 25G:
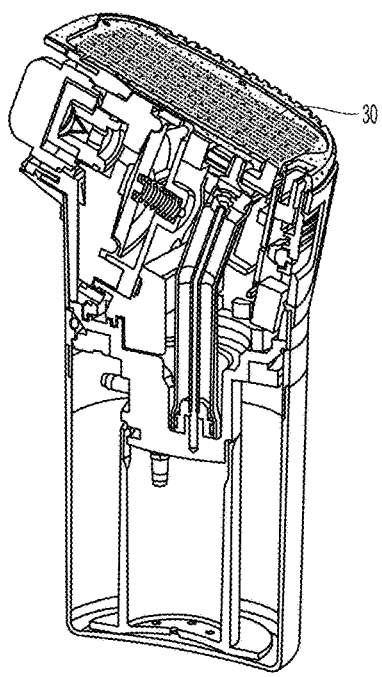
Figure 25H:
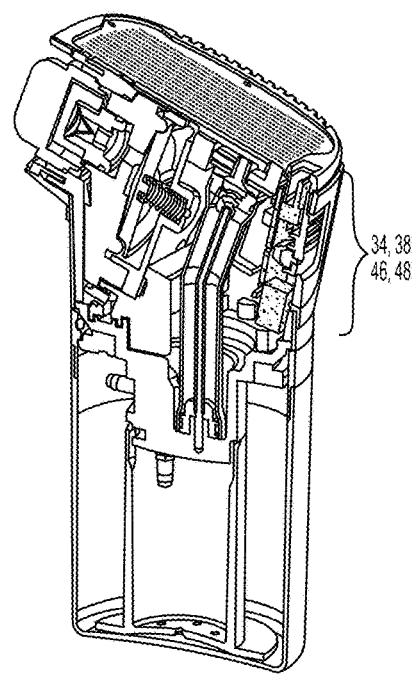

FIG. 25C highlights the location of dose pump 22 along with starter 26. Gas buffer 40 is clearly shown in FIG. 25D, as well as in all these cross-sectional drawings, and is located upstream of fuel cell 30. FIG. 25E highlights core 216, which includes gas buffer chamber 270 and disk 220, albeit these components have different shape and locations. Core 216 also has compensator chamber 506, shown in FIG. 25A. Hydrogen manifold 240 is located on top of gas buffer 40 and highlighted in FIG. 25F. Hydrogen manifold 240 may include relief valves 42, purge valve 44 and fluidics ON/OFF valves. Preferably, the system has two relief valves 42: one reusable low pressure relief valve that can reset after venting and one frangible burst disk that breaks at a higher temperature but would render fuel cell system 10 unusable if activated. Water knockout chamber 604 may also reside here. FIG. 25G highlights fuel cell 30 located on top of the system. Fuel cell 30 is covered by cover to protect the fuel cell and to allow air to reach the cathodes of the fuel cell. Suitable covers for fuel cells are disclosed in US published patent application nos. US2009/0081523 and US2009/0191435. FIG. 25H highlights the electronics of fuel cell system 10, such as DC-DC converter 34, switch 38 and 48, internal resistive load 46 and USB port 36, etc.

Any known fuel cell that consumes hydrogen can be used in fuel cell system 10. Preferably planar or side-by-side fuel cells are used. Suitable fuel cells are disclosed in U.S. Pat. Nos. 7,632,587, 7,378,176 and 7,474,075, published U.S. patent application nos. 2009/0311561, 2009/0162722, 2009/0130527 and US 2011/0165495 and published international patent application nos. WO 2009/105896, WO 2011/079378, WO 2011/079377, among others. These references are incorporated herein by reference in their entireties.

Liquid precursor 16 may also be carried within housing 50 but separate from solid precursor 18. Liquid precursor 16 preferably is isolated until a user removes a stopper or activates a starter or the like and then the liquid precursor may be dosed onto the solid precursor. Such systems are disclosed in U.S. Pat. Nos. 8,002,853, 7,481,858, 7,727,293 and 7,896,934, and published U.S. patent application nos. 2010/0104481, 2011/0189574, 2011/0243836 and 2009/0123342, among others. These references are incorporated herein by reference in their entireties.

Suitable pressure regulators usable as fluidic control element 31 or as element 33 are disclosed in U.S. Pat. No. 8,002,853, published international patent application no. WO 2011/127608 and published U.S. patent application nos. 2010/0104481 and 2011/0212374. These references are incorporated herein by reference in their entireties.

The preceding detailed description refers to the accompanying drawings that depict various details of examples embodiments. The discussion addresses various examples of the inventive subject matter at least partially in reference to these drawings, and describes the depicted embodiments in sufficient detail to enable those skilled in the art to practice the embodiments. Many other embodiments may be utilized other than the illustrative examples discussed herein, and many structural and operational changes in addition to the alternatives specifically discussed herein may be made without departing from the scope of the inventive subject matter.

Throughout the preceding description, specific details are set forth in order to provide a more thorough understanding of the invention. However, the invention may be practiced without these particulars. In other instances, well known elements have not been shown or described in detail in order to avoid unnecessarily obscuring the invention. The drawings show, by way of illustration, specific embodiments in which the invention may be practiced. These embodiments may be combined, other elements may be utilized or structural or logical changes may be made without departing from the scope of the invention. Accordingly, the specification and drawings are to be regarded in an illustrative, rather than a restrictive, sense.

All publications, patents and patent documents referred to in this document are incorporated by reference herein in their entirety, as though individually incorporated by reference. In the event of inconsistent usages between this document and those documents so incorporated by reference, the usage in the incorporated references should be considered supplementary to that of this document; for irreconcilable inconsistencies, the usage in this document controls.

In this document, the terms "a" or "an" are used to include one or more than one, independent of any other instances or usages of "at least one" or "one or more". In this document, the term "or" is used to refer to a nonexclusive or, such that "A, B or C" includes "A only", "B only", "C only", "A and B", "B and C", "A and C", and "A, B and C", unless otherwise indicated. The terms "above" and "below" are used to describe two different directions in relation to the center of a composite and the terms "upper" and "lower" may be used to describe two different surfaces of a composite. However, these terms are used merely for ease of description and are not to be understood as fixing the orientation of a fuel cell layer of the described embodiments. In the appended aspects or claims, the terms "first", "second" and "third", etc. are used merely as labels, and are not intended to impose numerical requirements on their objects.

It is intended that the present specification and examples be considered as exemplary only with a true scope and spirit of the invention being indicated by the following claims and equivalents thereof. Other embodiments of the present invention will be apparent to those skilled in the art from consideration of the present specification and practice of the present invention disclosed herein. Additionally, components or features of one embodiment can be utilized in other embodiments.

The invention claimed is:

1. A fuel cell system (10) comprising
a hydrogen generation system (12) connected to an electrical generation system (14) by a hydrogen line (28), wherein the electrical generation system comprises a fuel cell (30), and
a gas buffer (40) that stores hydrogen generated by the hydrogen generation system when the hydrogen generated exceeds an amount consumable by the fuel cell to generate electricity, wherein the gas buffer (40) is located away from the hydrogen line (28), wherein the hydrogen generation system (12) comprises a solid fuel that reacts with an aqueous liquid to generate hydrogen, the solid fuel comprising milled hybrid particles having a nominal particle size of about 110 microns, the hybrid particles comprising magnesium powder, iron powder and silicon powder, and one or more salts comprising sodium chloride and/or potassium chloride, wherein the iron powder has been passed through a 325 mesh, and the silicon powder has been passed through a 325 mesh.

2. The fuel cell system of claim 1, wherein the milled hybrid particles comprise first metallic particles coated by smaller second metallic particles, such that multiple galvanic cells are formed on a surface of the first metallic particles between the metals in the first metallic particles and the second metallic particles.

3. The fuel cell system of claim 1 wherein the solid fuel includes pellets positioned in a cup and disposed in a cartridge.

4. The fuel cell system of claim 1, wherein the solid fuel is disposed in a reaction chamber (300, 109) and the aqueous liquid is dosed into the reaction chamber.

5. The fuel cell system of claim 4, wherein the hydrogen generation system (12) further comprises a pressure equalization mechanism (24) that restores or maintains pressure equalization between a first pressure in the reaction chamber and a second pressure in the aqueous liquid.

6. The fuel cell system of claim 1, further comprising a liquid trapping member (604) to remove liquid from hydrogen gas.

7. The fuel cell system of claim 1, wherein the electrical generation system (14) comprises an auxiliary load (46).

8. The fuel cell system of claim 1, wherein the solid fuel comprises metal hydrides and oxides and salts thereof.

9. The fuel cell system of claim 1, wherein the magnesium powder has a particle size between 152 microns and 422 microns, the iron powder has a D10 greater than or equal to 4 microns, a D50 between 10 and 25 microns and a D90 less than or equal to 45 microns; and the silicon powder has a particle size of 44 microns.

* * * * *